(12) United States Patent
Engle

(10) Patent No.: US 7,404,473 B2
(45) Date of Patent: Jul. 29, 2008

(54) AUTOMATIC PARKING BRAKE FOR A RAIL VEHICLE

(75) Inventor: Thomas H. Engle, Clayton, NY (US)

(73) Assignee: Wabtec Holding Corp., Wilmerding, PA (US)

( * ) Notice: Subject to any disclaimer, the term of this patent is extended or adjusted under 35 U.S.C. 154(b) by 361 days.

(21) Appl. No.: 11/194,982

(22) Filed: Aug. 2, 2005

(65) Prior Publication Data

US 2006/0016647 A1 Jan. 26, 2006

Related U.S. Application Data

(63) Continuation-in-part of application No. 10/937,522, filed on Sep. 9, 2004, now Pat. No. 7,140,477.

(51) Int. Cl.
*F16D 65/14* (2006.01)
*B61H 13/02* (2006.01)

(52) U.S. Cl. ............. 188/107; 188/34; 188/153 R

(58) Field of Classification Search .......... 188/33, 188/34, 107, 106 F, 265, 153 R, 153 D; 303/7, 303/68, 69

See application file for complete search history.

(56) References Cited

U.S. PATENT DOCUMENTS

| | | | |
|---|---|---|---|
| 3,101,814 A | 8/1963 | Newell | |
| 3,595,347 A | 7/1971 | Billeter | |
| 3,731,766 A | 5/1973 | Campbell | |
| 3,757,908 A | 9/1973 | Fisher | |
| 3,780,837 A | 12/1973 | Haydu | |
| 3,907,078 A | 9/1975 | Means | |
| 4,033,629 A | 7/1977 | Spalding | |
| 4,060,152 A | 11/1977 | Bogenschutz et al. | |
| 4,068,746 A | 1/1978 | Munechika | |
| 4,312,428 A | 1/1982 | Beacon | |
| 4,493,246 A | 1/1985 | Dalibout | |
| 4,612,016 A | 9/1986 | Jaeger et al. | |
| 4,662,485 A | 5/1987 | Kanjo et al. | |
| 4,733,602 A | 3/1988 | Smith et al. | |
| 4,746,171 A | 5/1988 | Engle | |
| 4,793,446 A | 12/1988 | Hart et al. | |
| 4,978,178 A | 12/1990 | Engle | |
| 5,361,876 A | 11/1994 | Haverick et al. | |
| 5,507,368 A | 4/1996 | Barefoot | |
| 5,558,412 A | 9/1996 | Kanjo et al. | |
| 5,738,416 A | 4/1998 | Kanjo et al. | |
| 6,027,180 A | 2/2000 | Greenaway et al. | |
| 6,148,966 A | 11/2000 | Daugherty, Jr. et al. | |
| 6,241,057 B1 | 6/2001 | Hiatt | |
| 6,253,886 B1 | 7/2001 | Brugait et al. | |
| 6,279,689 B1 | 8/2001 | Zemyan | |
| 6,305,504 B1 | 10/2001 | Ring | |

(Continued)

*Primary Examiner*—Thomas J Williams
(74) *Attorney, Agent, or Firm*—Buchanan Ingersoll & Rooney PC

(57) ABSTRACT

A manual brake release and status indicator device for a parking brake for a rail vehicle, the manual brake release can include a positioner rod having a handle at one end and a second end connected to a positioner assembly which is associated with a parking brake clamp mechanism. The positioner assembly is movable via the handle to manually release the parking brake clamp from an applied position. The handle is associated with the status indicator, which can include a face plate positioned in proximity to the handle, wherein the position of the handle relative to the face plate indicates whether the parking brake is applied or released.

14 Claims, 22 Drawing Sheets

U.S. PATENT DOCUMENTS 6,378,668 B1 4/2002 Zemyan et al.
6,397,986 B2 6/2002 Moore
6,578,679 B2 6/2003 Hill et al.
2001/0050027 A1* 12/2001 Engle .......................... 188/34
2002/0185343 A1* 12/2002 Wedge et al. ................. 188/34

* cited by examiner

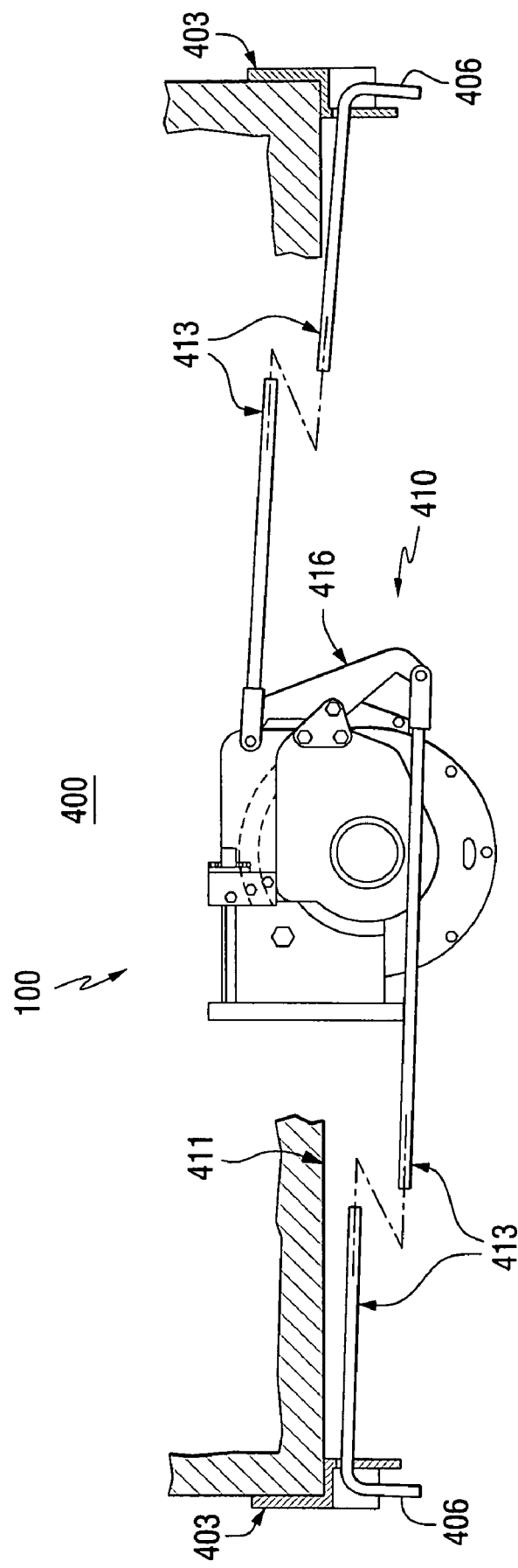

AUTOMATIC PARKING BRAKE FOR A RAIL VEHICLE

CROSS-REFERENCE TO RELATED APPLICATIONS

This application is a continuation-in-part application of U.S. patent application Ser. No. 10/937,522, filed Sep. 9, 2004 now U.S. Pat. No. 7,140,477.

BACKGROUND

This invention relates generally to a parking brake for a rail vehicle braking system which can automatically lock the brakes on the rail vehicle in an applied position responsive to a brake application. More particularly, the invention relates a manual release device and status indicator for such an automatic parking brake. The automatic parking brake can be configured for use on both truck and car mounted rail car brake systems.

Freight car handbrakes provide two distinct functions, both important. One is to serve as a parking brake to prevent a car or cut of cars from moving when detached from a locomotive. The other is to serve as a manual speed-control brake on slow moving cars, as is often done with bulk commodity cars. While the conventional handbrake, as an individual car-based system, meets both sets of service requirements, this utility comes at a high cost. Both the normal use and the misuse of handbrakes generate substantial costs for railroads and/or car owners, in several different ways, including failure of a crewman to release a handbrake after normal use as a parking brake, mishaps during normal use as a parking brake, and time lost in waiting for a crewman to walk to, operate, and return from operation of the handbrake. The normal operational use of handbrakes on individual cars is both time consuming and labor intensive; and mishaps resulting from the task of setting and releasing handbrakes during such normal use accounts for a relatively high incidence of personal injury claims and lost time. Misuse, such as dragging cars with unreleased handbrakes is a pervasive, industry-wide problem that leads to inordinate numbers of wheelset changeouts and related equipment downtime. Additionally, trickle-down damage, such as from slid-flat wheels, create impacts on the rail and car that can damage equipment and lading, and increase both track and equipment maintenance costs.

The operation of a handbrake requires the presence of a trainman at that particular car; and the time for him to reach the car, operate the device, and move to another car or return is considerable. Later on, when the handbrake should be released, this time requirement is imposed a second time. Where remote-controlled locomotives are used, the entire switching operation must be held up until sufficient handbrakes are set to hold a car or group of cars. The tasks of setting up handbrakes every time cars are parked and then locating and releasing them when such cars are to be moved thus consumes substantial time and labor, which is a costly drain on railroad operations and productivity.

Parked cars must be secured, but the requirement that trainmen twice visit each car location in order to do so could be eliminated and the system effectiveness improved if a train-based system could be used rather than car-based equipment.

An automatic parking brake as described hereinafter could alleviate many of the problems and costs associated with handbrake use. Such a parking brake can be applied automatically, anytime cars are parked, and can also be released automatically when desired. Both the setup and release can be carried out without leaving the locomotive, and the holding power of the parking brake on any one car will be similar to that of the manual handbrake. Furthermore, and quite importantly, if empty cars are moved without releasing the parking brake, it will not normally result in any wheel sliding.

Accordingly, widespread implementation of such an automatic parking brake could eliminate a major portion of the problems and related costs associated with handbrake usage today, including wheel damage, secondary rail and equipment damage, time and labor requirements and injury claims. Moreover, in addition to resolving such existing problems as described previously, the automatic parking brake can also provide a measure of added safety for grade operations. For example, the automatic parking brake makes it easier to secure trains stopped on a grade and essentially provides a mechanical backup to the pneumatic emergency brake. Ultimately, each of these improvements in operating efficiency would directly impact train crew responsibilities and requirements.

A typical rail car hand brake system normally consists of an apparatus for manually applying and biasing one or more brake shoes against the tread of one or more wheels of the rail car by either turning a hand wheel or pumping a ratchet handle on a hand brake mechanism attached to the rail car. In both truck and car mounted rail car braking systems (illustrated in FIGS. 1-3), the hand brake mechanism is usually either a cast or stamped metal gear housing, and is typically attached to an outside end wall of the rail car. A rotatable chain drum must be rotated by turning the hand wheel to wind a brake chain onto the chain drum. The other end of the brake chain normally extends through the bottom of the gear housing and is interconnected with cable or other linkage, such as a hand brake lever, to the brake beams which carry the brake shoes. The winding of the brake chain onto the chain drum applies tension to the brake chain and brake linkage to draw the brake shoes against the tread surfaces of adjacent rail car wheels and, accordingly, applies the hand brake as intended.

A disadvantage of this prior art type hand brake arrangement is that train operators must manually apply the parking brake on each car to be left standing alone. When coupled groups of cars are to be left, it is up to the operator's judgment how many of the handbrakes must be set, and how hard the hand wheel must be turned to set them. This requires a considerable amount of time and labor. Additionally, the operators must be certain that the hand wheel is turned a sufficient amount to ensure that the parking brake is engaged. The possibility also exists that an operator may forget to apply the brake altogether on a rail car, which could result in unexpected movement of the rail car while parked at the siding or yard. Alternatively, wheel damage can result due to a failure to release the handbrake from the applied position before the car is to be moved. Operation of the hand wheel also requires exerting a considerable amount of physical force from an a sometimes awkward position, which can make the hand brake difficult to apply. Injuries to operators also sometimes occur related to hand brake use, primarily due to slipping and tripping, but injuries due to overexertion have also been noted. Furthermore, since brake cylinder pressure can leak over time, a potentially hazardous condition can develop if a loss of brake cylinder pressure occurs subsequent to an emergency brake application, and particularly if the train is stopped on a grade.

A loaded brake engagement mechanism has been used in Type AB-8 and AB-10 Manual Empty and Load Freight Car Brake Equipments, manufactured By Westinghouse Airbrake Technologies, Inc., the assignee of the present invention. As described in *Instruction Pamphlet* 5062-2 *Sup*. 1, dated May 1942, this mechanism incorporated a telescoping housing, hollow rod and push rod arrangement inside a specially designed "UL" type brake cylinder, called a "load brake cylinder" which was used to make a loaded brake application. The load brake cylinder was one of two separate brake cylinders on the rail vehicle, the other being an "empty brake cylinder," which were used to control the application of brakes on the rail vehicle. The piston push rods of each brake cylinder were connected to a common lever, called the live cylinder lever, which was connected to the brake rigging on the rail car. In the load brake cylinder, the push rod telescoped within a hollow tube, and through a housing fastened to the end of the hollow rod the relationship between the hollow rod, & housing and the push rod was regulated by a ratcheting mechanism carried in the housing which cooperated with notches in the push rod and which carried a ratchet release trigger whose operation will be explained. During a loaded brake application, the empty brake cylinder would operate and, via the connection of the push rods of both the empty and load brake cylinders to the live brake cylinder lever, the push rod of the load brake cylinder would be pulled from the hollow rod as a result of force exerted on, and motion imparted to the push rod of the empty brake cylinder by its pressurization. The ratcheting mechanism was not operational in the release position of the load cylinder because in this position the release trigger was tripped. The load cylinder pushrod thus telescoped unimpeded out from the housing during the movement of the empty cylinder's piston and hollow rod. When, in the loaded car condition, the empty brake cylinder reached maximum extension of the push rod, the load brake cylinder could be pressurized through a special load sensing valve, which caused the load cylinder's hollow rod and housing to extend.

Extension of the housing containing the ratcheting mechanism would operate the ratchet trigger as soon as the housing moved away from the load cylinder body, and the now effective ratchet would prevent the push rod from returning to its telescoped position relative to the housing as the housing advanced under the influence of load cylinder pressurization. The push rod was thus caused to extend an additional amount along with the housing, thereby increasing the braking force. Basically, the telescoping function of the load cylinder push rod with respect to the housing, controlled via the ratcheting mechanism, permitted the application of additional piston force at a further distance from the pivot point of the live cylinder lever, without using an appreciable amount of air over and above that required for the empty cylinder, thus increasing the force delivered by this lever to the brake shoes at little price in air consumption as compared with an empty brake application.

When he brake was released, the ratchet mechanism, absent the release trigger, would have prevented the release of the shoes, because the load cylinder, even in release position, would have held its pushrod extended and thus held the live cylinder lever in its fully applied—empty car state.

This undesirable state of affairs was prevented by the operation of the ratchet release trigger operating as a result of the return of the hollow rod to its release position bringing the trigger back into contact with the cylinder's non-pressure head, tripping the ratchet release, and permitting the load cylinder pushrod to withdraw into the housing and hollow rod. This mechanism, however, was not a parking brake and could not address the disadvantages listed above.

A rail vehicle parking brake which is adapted to address such disadvantages of conventional rail vehicle parking brakes is described in co-pending U.S. patent application Ser. No. 10/438,141, assigned to the assignee of the present invention, the disclosure of which is hereby incorporated herein by reference. Additional embodiments of a parking brake for a rail vehicle which can be applied automatically to lock the brakes on the rail vehicle are disclosed hereinafter.

Moreover, for such automatic parking brakes it is desirable to provide a manual release device which is simple to understand and easily operated, as well as a status indicator to show railroad personnel to quickly, visually determine whether the automatic parking brake is in the applied or released position.

SUMMARY

According to the invention, a parking brake for a rail vehicle, such as a freight car, is provided which can lock the rail vehicle brakes in an applied position automatically, for example in response to an emergency brake application, to prevent an unwanted release of the rail vehicle brakes as might otherwise occur over time as a result of normal air leakage or equipment defects. The parking brake can accomplish this by preventing the brake cylinder piston push rod from moving from an applied position to a released position. The parking brake can selectively be placed in an activated or deactivated mode. The parking brake can be activated automatically immediately after movement of the piston push rod to apply brakes on the vehicle. Subsequent to such a brake application, the parking brake can prevent retraction of the push rod even if there is a loss of brake cylinder pressure. Release of the parking brake can also be implemented automatically, for example responsive to restoration of brake pipe pressure, or manually at each car via provision of a manual release rod similar to or combined with the brake cylinder release rod of existing AAR standard freight car brake equipment.

In one embodiment of the parking brake, a split ring clamp assembly can be activated to grip the push rod subsequent to a brake application. The split ring clamp can encircle the piston Hollow rod and its contained push rod and can be closed against the hollow rod to block retraction of both it and its enclosed push rod. The clamp ring can likewise be opened to release the piston hollow rod to permit the brakes to be released when desired. An actuator can be provided to operate the clamp ring assembly, and a manual release handle can also be provided. The actuator can selectively control the clamp ring assembly to engage the push rod only under certain circumstances, such as, for example, immediately after an emergency brake application.

In another embodiment of the parking brake the blocking device can employ a collet type clamp assembly associated with the push rod. The collet can have self-activating jaws which permit extension of the piston hollow rod to apply the brakes, but automatically grip the hollow rod upon movement of the hollow rod in an opposite direction to release the brakes. An actuator can be provided to control the collet clamp assembly, and a manual release handle can also be provided.

A further embodiment of the parking brake can employ a blocking device having a bar with one end connectable the brake rigging and another end slidably received through a guide portion. The guide portion can be fixed, and a locking portion can be provided which cooperates with the guide portion and the end of the bar which is slidably received through the guide portion. The locking portion can permit sliding movement between the bar and the guide portion in one direction to apply the brakes, but can automatically engage the bar to block sliding movement between the bar and the guide portion if the bar begins to move in the opposite direction, thereby preventing the brakes from being released until the locking portion releases engagement with the bar.

The locking portion can be a ratcheting member and the bar can be provided with notches engaged by the ratcheting member. The locking portion can be designed to be used external of the brake cylinder, wherein the bar and guide portion cooperate to block retraction of the brake rigging, or internally of the brake cylinder, wherein the bar and guide portion cooperate to block retraction of the piston push rod or hollow rod.

According to further embodiments of the invention, a manual release device and status indicator is provided which can generally comprise an externally visible operating station and manual release handle, as well as a release apparatus connected between the release handle and the automatic parking brake for manually releasing the parking brake from an applied position. The release apparatus can extend between the automatic parking brake and both sides of the rail car, such that externally visible operating stations and manual release handles can be provided on each side of a rail car to permit the automatic parking brake to be manually released from either side of the rail car.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which:

FIG. 23 is a side view of an embodiment of a manual release and indicator system operatively associated with an automatic parking brake.

DETAILED DESCRIPTION OF CERTAIN EMBODIMENTS

Figure 1:
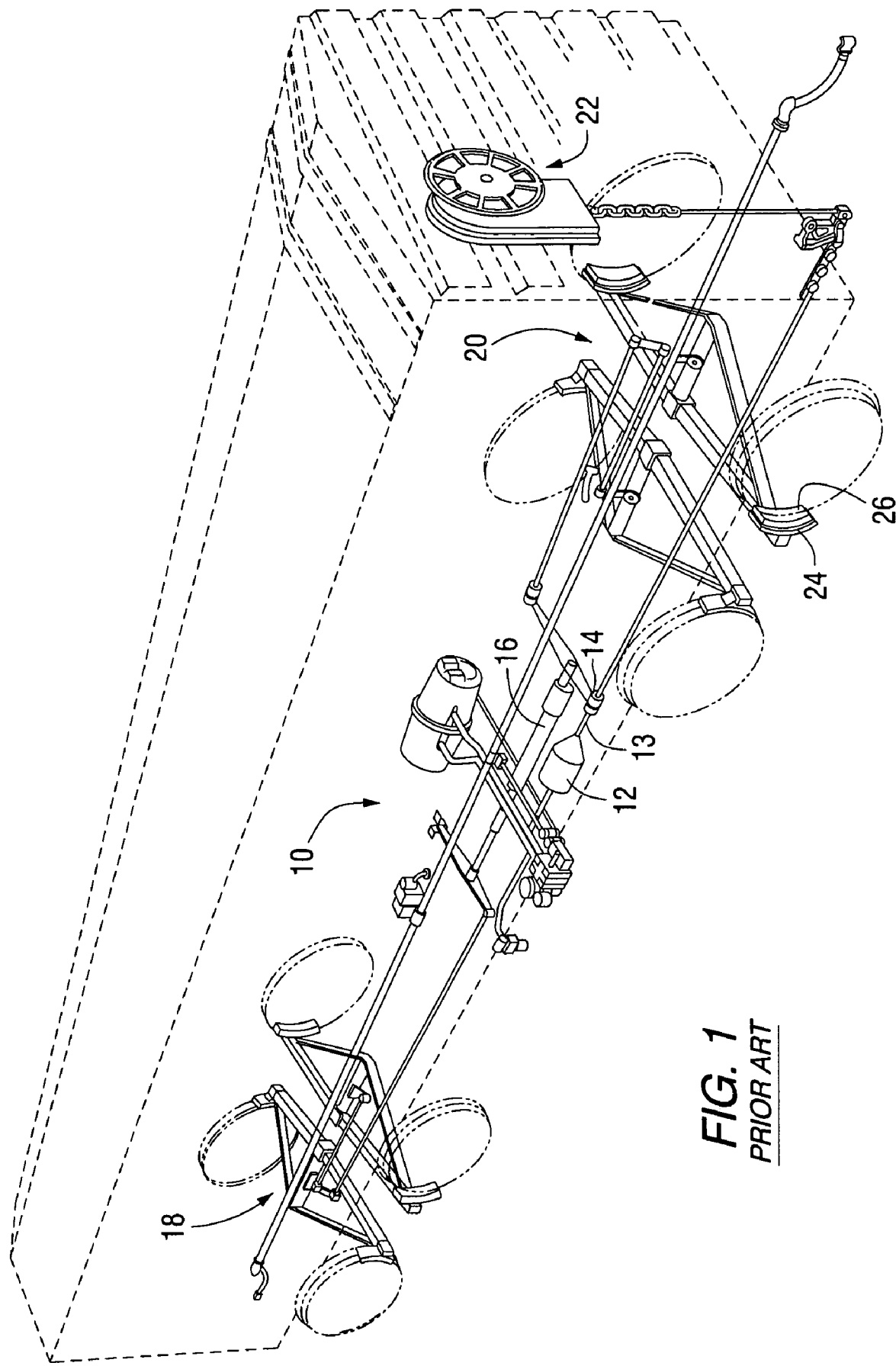
FIG. 1 is a plan view of a prior art type car-mounted brake system having a conventional prior art hand wheel hand brake or parking brake.
Figure 2:
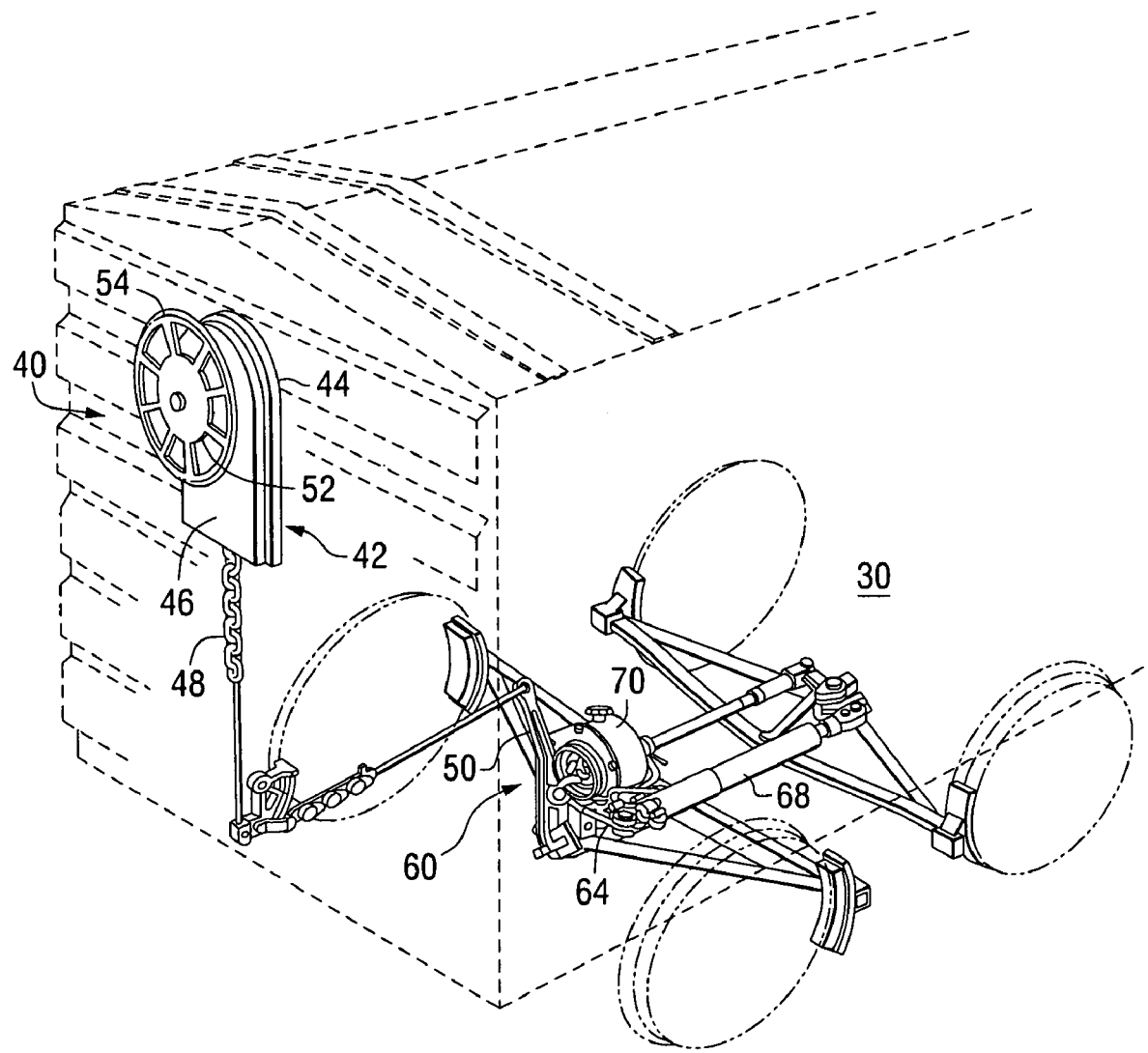
FIG. 2 is a plan view of a prior art type truck-mounted brake system having a conventional prior art hand wheel hand brake or parking brake.
Figure 3:
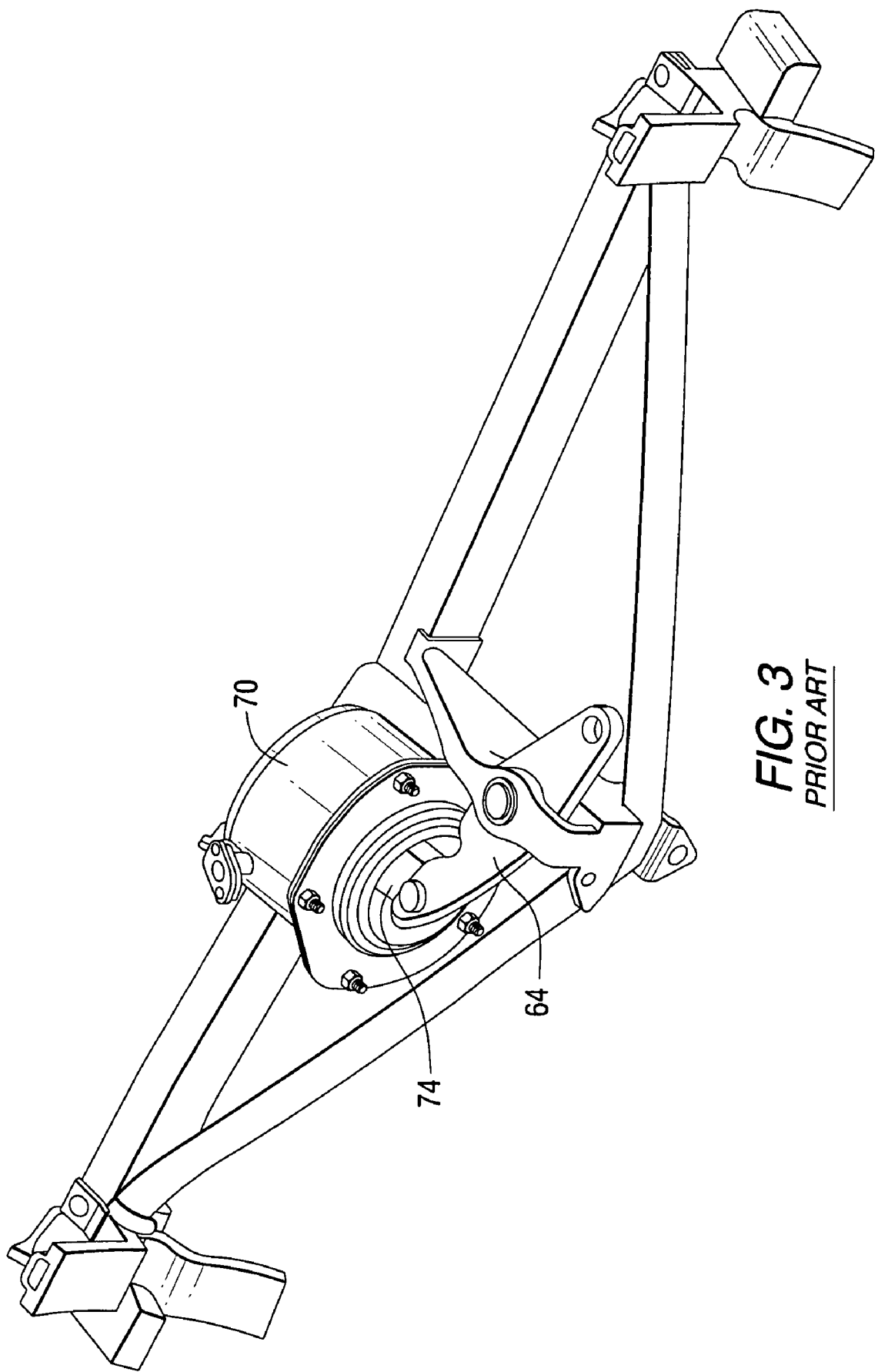
FIG. 3 is an enlarged view of a portion of the truck-mounted brake system shown in FIG. 2, showing more details of the brake cylinder.

Referring now to the drawing figures wherein like reference numbers refer to similar parts throughout the several views, prior art rail vehicle braking systems are shown in FIGS. 1-3, which illustrate both car and truck mounted braking systems, respectively.

FIG. 1 shows a prior art car mounted brake assembly, generally designated 10, for a rail vehicle. The car mounted brake assembly 10 includes a brake cylinder 12 having a piston push rod 13 connected to a cylinder force transfer lever 14. A slack adjuster 16 is also shown associated with the cylinder force transfer lever 14, and a pair of brake beams 18 and 20 are mounted at each end of the car mounted brake assembly 10. A hand brake or parking brake 22, is also provided which is associated with the cylinder force transfer lever 14. The brake beams 18, 20 are actuated by the brake cylinder 12 or the hand brake 22, via the cylinder force transfer lever 14 and a series of additional levers and linkages. Brake levers are used throughout the braking system to transmit, increase, or decrease braking force, as well as to transfer or change direction of force. Thus, during a braking situation wherein a force is applied by the brake cylinder 12 or the hand brake 22, these levers and rods transmit and deliver braking forces to the brake beams 18 and 20 and, consequently, to the brake heads 24 and brake shoes 26 mounted thereon.

Referring to FIGS. 2 and 3, a prior art truck mounted brake system 30 is shown. The hand brake mechanism 40 has a housing 42 including a back wall 44 mountable on a rail car and a cover 46. The cover 46 is secured to the back wall 44. A chain 48 for application or release of the brakes is connected, as is conventional, to the brake rigging via a hand brake lever 50, and is attached to and wound on a winding drum 52. The hand brake lever 50 is, in turn, connected 13. to cylinder force transfer lever 64. In order to apply the brakes, a hand wheel 54 is rotated in a clockwise direction to wind the chain 48 about the winding drum 52 and to cause the hand brake lever 50 to be pulled in an outward direction away from the brake rigging, generally designated 60. This causes the cylinder force transfer lever 64 to be rotated in a counterclockwise direction resulting in the piston push rod 74, shown in FIG. 3, being pulled in an outward direction and the required force being applied to the slack adjuster assembly 68. This force is similar to the force which is applied by the brake cylinder piston rod, not shown, of the air cylinder assembly 70 when such is pressurized.

Figure 4:
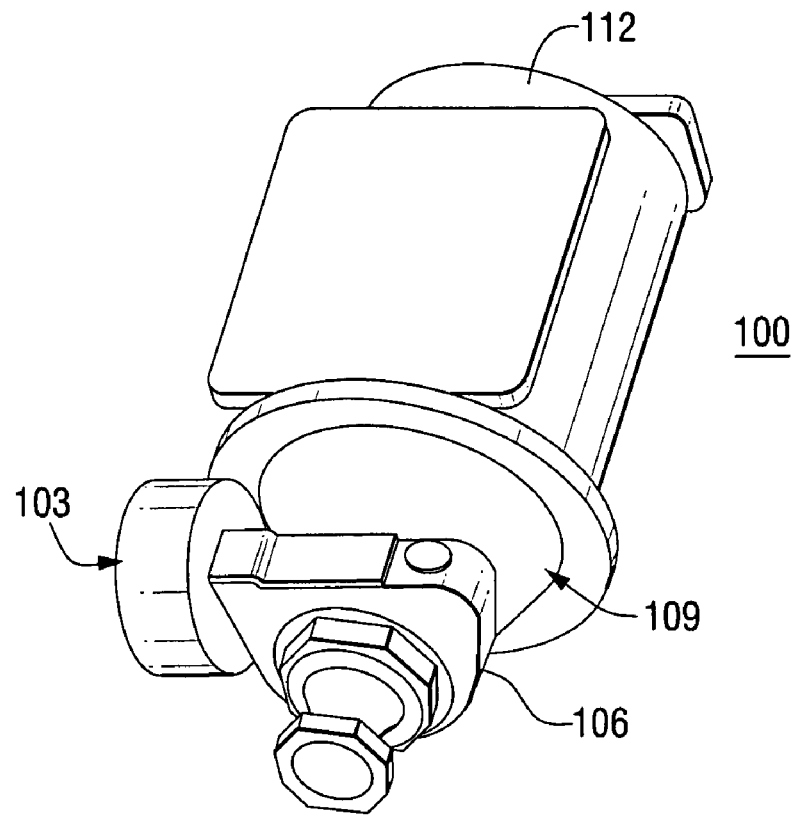
FIG. 4 is a perspective view of an embodiment of an automatic parking brake according to the invention.
Figure 5:
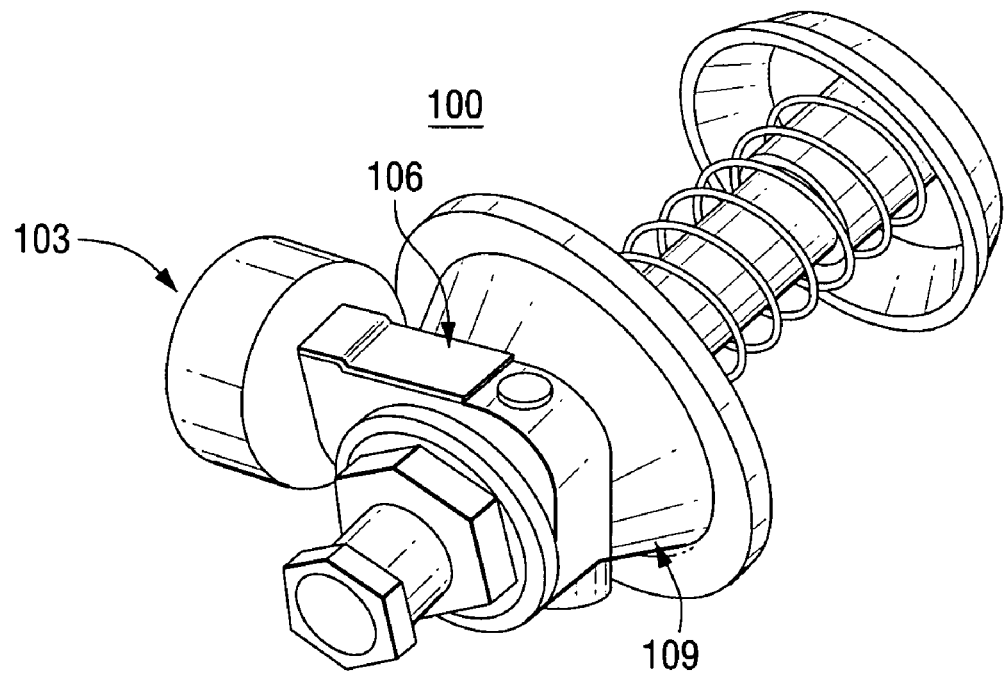
FIG. 5 is a perspective view of a portion of the automatic parking brake shown in FIG. 4.
Figure 6:
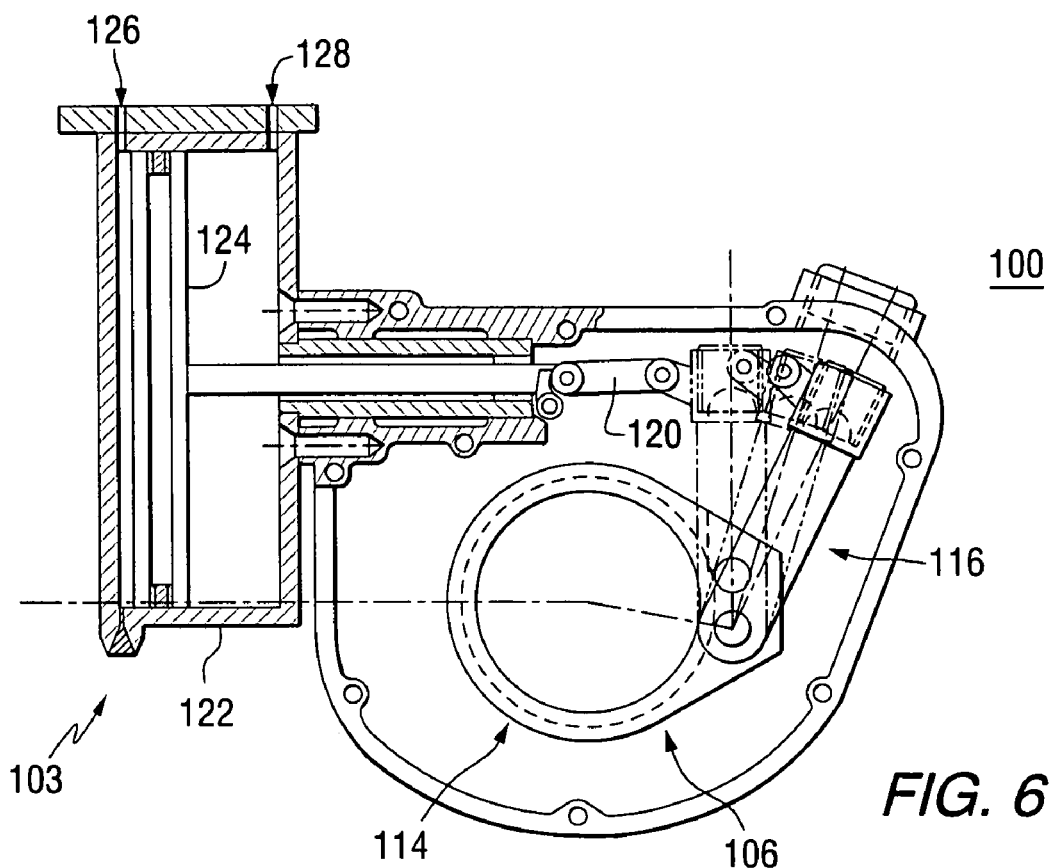
FIG. 6 is a cross-section view of an embodiment of a clamp portion of an automatic parking brake according to the invention.
Figure 7:
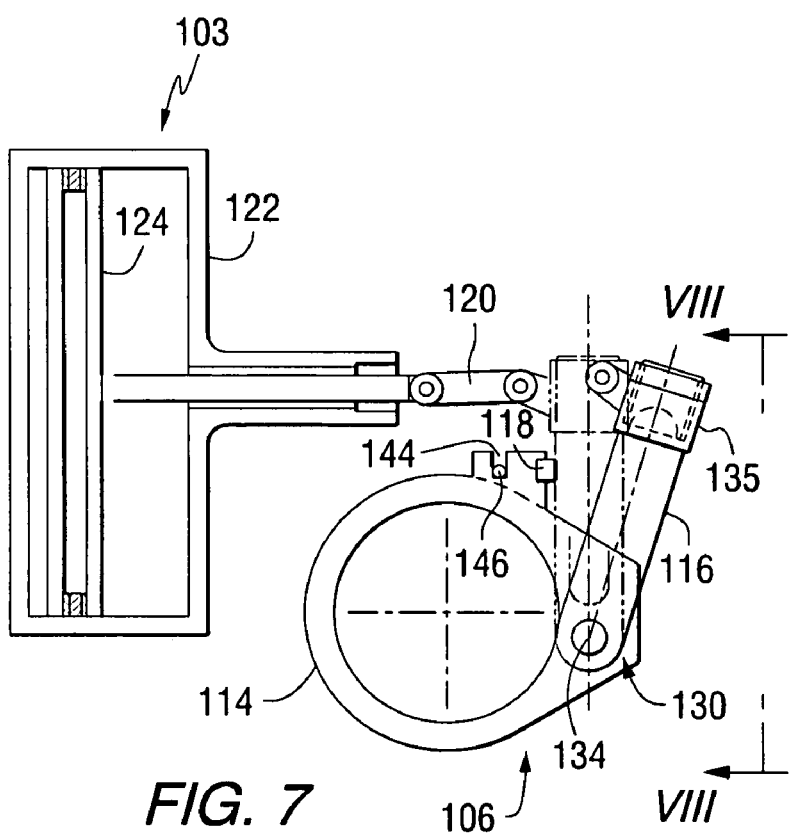
FIG. 7 is a cross-section view of an embodiment of a clamp portion similar to the clamp portion shown in FIG. 6.
Figure 8:
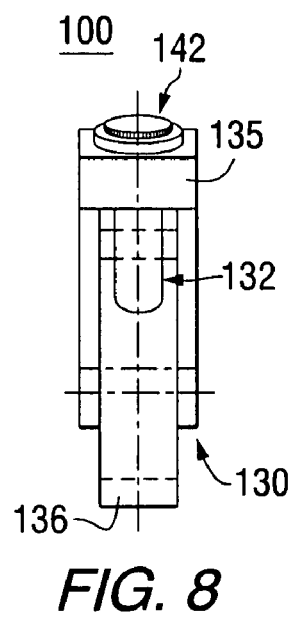
FIG. 8 is a view taken along line VIII-VIII in FIG. 7.

Referring now to FIGS. 4 and 5, an embodiment of an automatic parking brake 100 according to the invention is shown having a parking brake actuator 103 and clamp assembly 106 built into a non-pressure head 109 of a conventional rail vehicle brake cylinder 112. The parking brake 100 employs a specific geometry designed to fit in the minimum space available on the non-pressure head 109 of, for example, a conventional Westinghouse Air Brake Company U-Type brake cylinder 112.

Unlike a handbrake, the automatic parking brake 100 need not generate high braking forces through a long travel. Instead, the car-holding function can be achieved simply by retaining braking force that is generated pneumatically. Other than links to the manual release lever and status indicators, the entire unitized automatic parking brake 100 can be carried on a modified non-pressure head 109 fitted to a standard brake cylinder 112, as shown best in FIG. 5. The automatic parking brake 100 does not alter the normal cylinder lever position or travel.

The unitized design, i.e., incorporating the piston and pre-caged spring, facilitates a relatively simple installation for both new rail vehicles and for retrofitting the existing brake systems on rail vehicles already in service. Since the piston and precaged spring are already included with the new unitized parking brake 100, retrofitting is very convenient. All that need be done is replace the existing, conventional non-pressure head assembly, including the piston and pre-caged spring, with the new unitized design which has the parking brake actuator and clamp assembly incorporated with a new piston and pre-caged spring. Truck-mounted brakes require a similar retrofit on each truck, on each of the two brake cylinders.

As shown more clearly in FIGS. 6 through 11, the automatic parking brake 100 can include a split ring clamp 114 which encircles the piston push rod (not shown), wherein the clamp ring assembly 106 can be operated using an over-center lever arrangement 116 which is activated via the parking brake actuator. The clamp ring 114 assembly is easily adjustable, and all high clamping forces are reacted out in the clamp ring 114, while application forces are kept around 850 pounds, which is easily handled by the existing structure. The clamp ring 114 will lock in the clamped position when the lever arrangement 116 is pulled "over center." The travel of the over-center lever arrangement 116 can be limited by a stop member 118, which can be part of, or mounted on, the clamp ring 114. A loss of clamping stroke associated with locking the clamp ring 114 can be minimized by making the stop member 118 adjustable.

The parking brake actuator 103 can be, for example, a small pneumatic actuator, and can control the split ring clamp 114 via a linkage 120 connecting over-center lever arrangement 116 to the actuator 103. In the open position, clearance between the clamp ring 114 and the brake cylinder push rod permits the push rod to slide freely through the clamp 114, such as during a brake application. However, the pneumatic actuator 103 can close the clamp ring 114 tightly around the push rod, to hold the push rod securely in the applied position with no back-slip. Once clamped, the parking brake 100, via the clamp ring 114, will mechanically retain the applied brake force, much like a ratcheted conventional handbrake. Tests have shown that the clamp ring 114 can retain approximately 90% of the emergency brake shoe force indefinitely, even if the brake cylinder pressure is completely exhausted.

In the embodiment shown, the brake actuator 103 can be a relatively small, short-travel pneumatic cylinder 122 with a double-acting piston 124, an end of which is connected to the actuating linkage 120. The position of the piston 124 can be controlled pneumatically via a brake pipe port 126 communicating on the face of the piston 124 and a brake cylinder port 128 communicating on the back of the piston 124. However, it will be understood to one of ordinary skill in the art that other types of actuators could be employed, such as, for example, an electrically operated brake actuator.

As illustrated best in FIGS. 7-9B, the over-center lever arrangement 116 can include two members 130, 132 of unequal lengths which are connected to opposing ends of the split ring clamp 114. The split ring clamp 114 is closed, i.e., the ends are drawn together, when the two unequal length members 130, 132 are rotated (in this example—counterclockwise) about a point 134 where the longer member 130 is connected to the split ring clamp 114. To open the split ring clamp 114, the two unequal length members 130, 132 are rotated in the opposite direction, i.e., clockwise.

The longer member 130 is referred hereinafter to as the tension member, whereas the shorter member 132 is referred to as the compression member. The tension member 130 is shown best in FIGS. 7 and 8, and can include two spaced apart, generally parallel plates connected at the top by a bracket 135. At the bottom the spaced apart plates are rotatably connected, e.g., pinned, to a mounting portion 136 on the lower end of the split ring clamp 114. The mounting portion 136 can be a projection which fits between the parallel plates of the tension member 130 and is rotatably connected thereto via a pin inserted through coaxial mounting holes through both parallel plates and the projection. At the top end of the tension member 130, the bracket 135 is pinned to the actuating linkage 120, which is connected to the rod end of the double acting piston 124 of the short travel pneumatic cylinder 103.

Figure 9A:
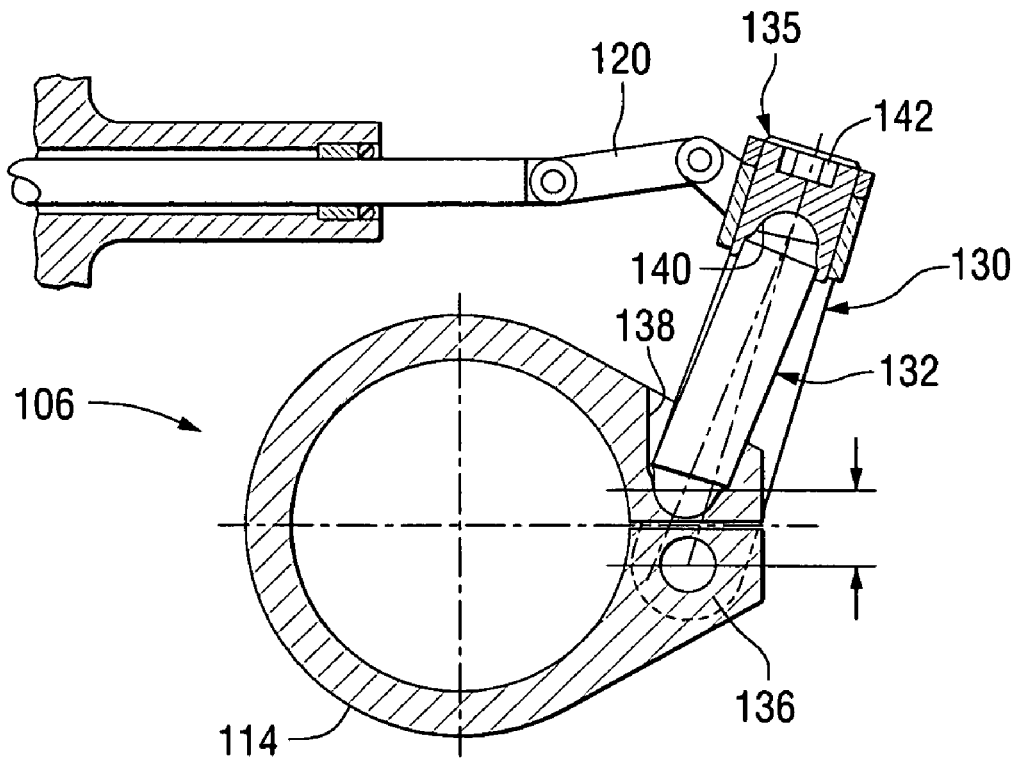
FIG. 9A is a section view of an embodiment of a clamp portion, similar to the clamp portion in FIG. 7, shown in an open position.
Figure 9B:
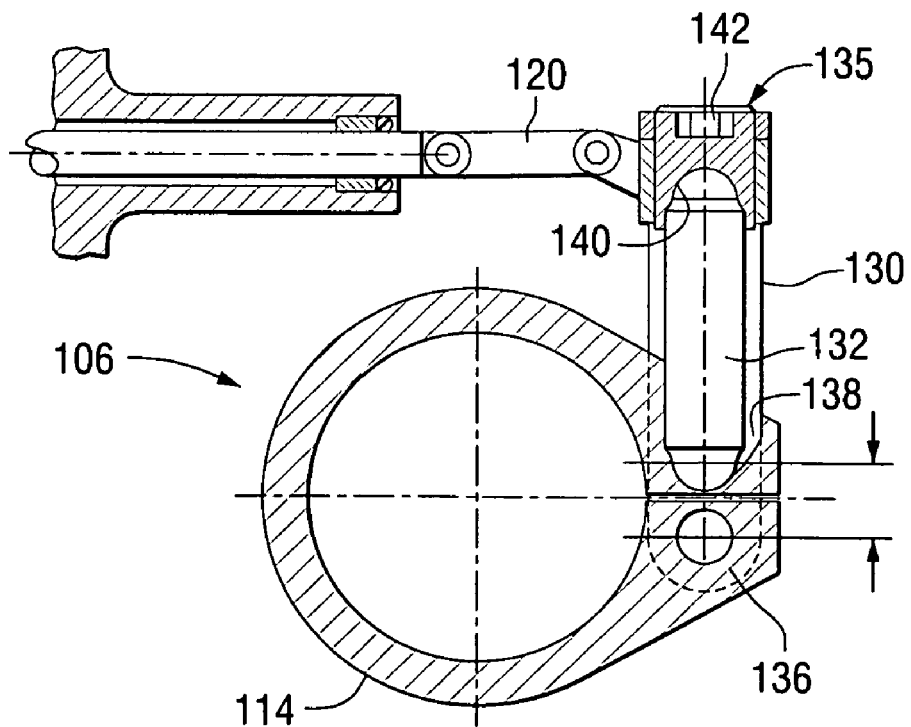
FIG. 9B is a section view of the clamp portion in FIG. 9A, shown in a closed position.

Referring particularly to FIGS. 9A and 9B, the compression member 132 can be located between the parallel plates of the tension member 130. The compression member 132 can be a column with rounded ends, captured between the upper end of the split ring clamp 114 and the bracket 135 at the upper end of the tension member 130. The lower end of the compression member 132 is supported in a pocket 138 formed in the upper end of the split ring clamp 114, and the opposite, upper end, of the compression member 132 is similarly supported by a pocket 140 in the bracket 135. The pocket 138 in the upper end of the clamp ring 114 can be machined with a spherical bottom, and appropriately sized and shaped to permit the compression member 132 to freely pivot about the radius in the fore and aft direction. This permits a sufficient degree of angular mobility for the compression member 132 to move when the parking brake actuator 103 moves the tension member 130. FIG. 9A shows the split ring clamp 114 in the open position, whereas FIG. 9B shows the split ring clamp 114 in the closed position.

Additionally, a clamp force adjustment member 142 can also be provided, wherein the pocket 140, in which the top of the compression member 132 is positioned, can be machined into the end of a threaded adjusting screw. The thread adjusting screw can be received in the top of the bracket 135 on the tension member 130. A threaded locknut on the outer end of the thread adjusting screw can also be provided to assure a secure lock once adjustment has been made at initial setup. The clamp force adjustment member 142 can be used to adjust the difference in the (unequal) length of the compression 132 and tension 130 members. Adjusting this difference varies the clamping force on the push rod.

In the embodiment shown, counter-clockwise rotation of the tension member 130, and thus the unequal length compression member 132 carried thereby, will draw the upper and lower ends of split ring clamp 114 together, up to the point where the center lines of the tension 130 and compression 132 members are collinear (after which the ends of the split ring clamp 114 would begin to move apart). The adjustable over-travel stop member 118 can be provided, such as on the split ring clamp 114 in a location cooperable with the tension member 130, to prevent the tension member 130 from rotating past the collinear point by more than a few thousandths of an inch. Rotation in the opposite, i.e., clockwise, direction will re-open the clamp 114 and permit the push rod to retract and release the brakes.

Additionally, a slot 144 can be provided on the outer surface of the split ring clamp 114 to receive an anti-rotation pin 146. The anti-rotation pin 146 prevents tension member 130 from rotating past center more than a few thousandths of an inch. A portion on the split ring clamp 114, such as a lug, can be machined to accommodate both the anti-rotation pin 146 and the over-center, i.e., over-travel, stop 118 for the tension member 130 in the locked (vertical) position. The tension member 130 can be, for example, forged from 4140 steel or equal, and should more spring be required at this point, the parallel plate portions could be formed slightly bowed.

The design of the pneumatic actuating cylinder 103 was chosen to provide sufficient force to apply the lock with 30 psi brake cylinder pressure. This can be done because, if cars are to be switched with air, there may be times when trains will move without a full charge and, for example, if a transfer string which would in present practice be moved with no air connected, management and crew alike might be inclined to leave the yard as soon as possible. Thus, if there was enough air showing on the cab gage to indicate that the trainline was intact, the engineman might move the train prematurely. In such cases, an emergency application might not produce full brake cylinder pressure on all cars, and this is thus taken into account in the design for sufficient force with only 30 psi available brake cylinder pressure.

The double acting piston 124 can further include a rod seal (not shown). The two types of seals shown on the actuator are examples of two alternative seals which could be used.

Figure 10:
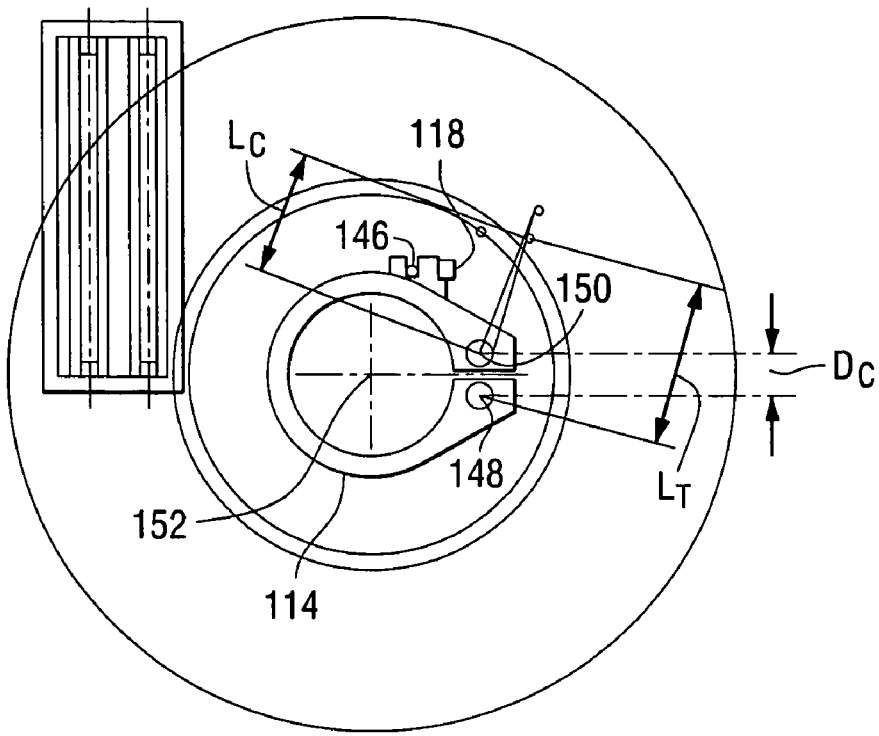
FIG. 10 is a diagram illustrating geometry representative of a clamp portion of an automatic parking brake according to the invention.

Referring now to FIG. 10, the critical lengths of the members as well as their layout and pivot centers opposite the edges of the split are shown in the enlarged diagrammatic front view. Some example dimensions for a presently preferred embodiment can include a 2.26 inch compression member ($L_C$) cooperating with a 2.93 inch tension member ($L_T$). The distance ($D_1$) between the clamp centers 148, 150, i.e., where the compression $L_C$ and tension $L_T$ members, respectively, attach to the opposing end of the split ring clamp 114 can be about 0.69 inch when the clamp 114 is in the closed position. The centerline of each of the clamp end centers 148, 150 is generally aligned in this (closed) position, and are about 1.87 inches ($D_2$) offset from the center 152 of the clamp ring 114.

Figure 11:
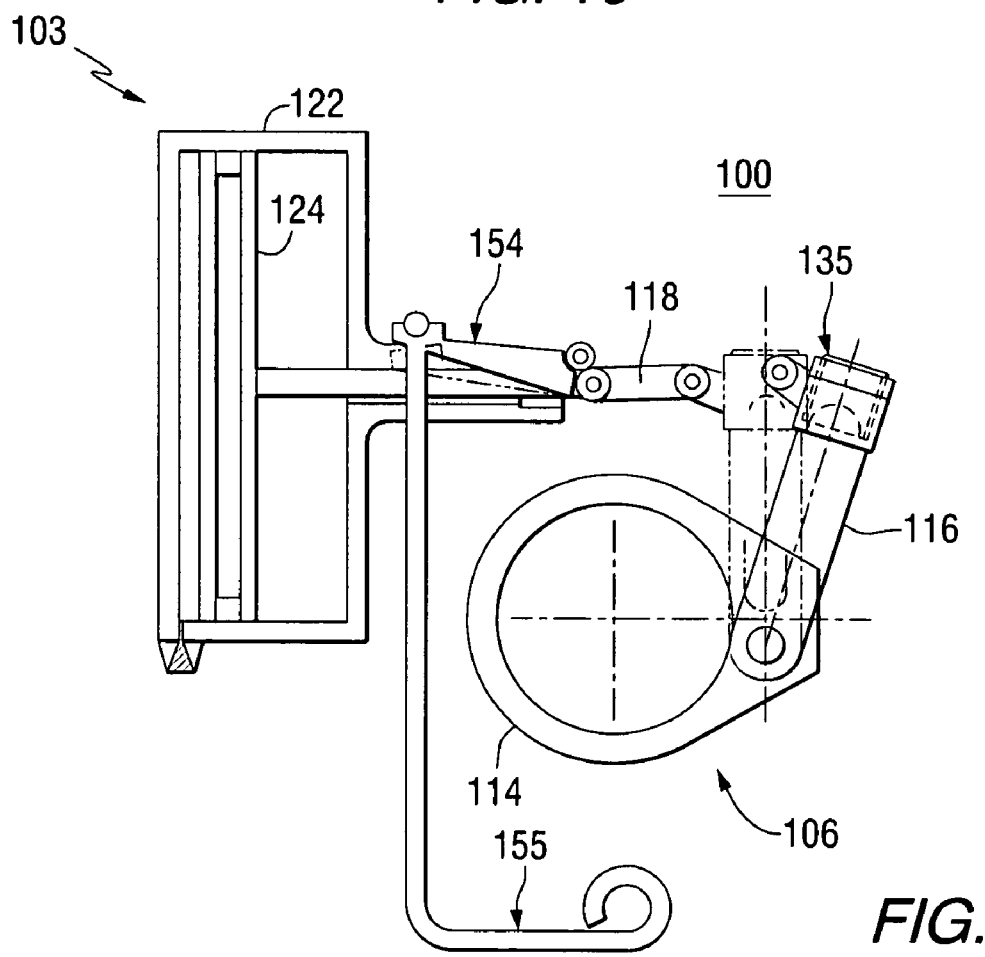
FIG. 11 is a section view of an embodiment of a clamp portion, similar to the clamp portion shown in FIG. 7, and including a manual release member.

As shown in FIG. 11, the automatic parking brake can also include a manual latch release lever 155. The manual release lever can be an elongated rod having a handle at one end and an opposite end connected to a manual latch release mechanism 154 on the parking brake actuator 103. When the parking brake is activated, i.e., holding the push rod in an applied position, the brake release lever 155 can be manually operated to trip the latch release mechanism 154. The latch release mechanism 154 is designed, when tripped, to force the lever arrangement 116 back over center, thereby opening the clamp ring 114 and releasing the push rod.

The manual release lever 155 could also be interlocked in some manner with an existing the brake cylinder release valve. In this case, if the brake cylinder release valve handle were pulled, the latch release mechanism 154 would also be tripped, resulting in opening the clamp ring 114 and releasing the push rod to restore normal service capability to the brake cylinder. Conversely, if the manual release lever 155 were pulled, it would also activate the brake cylinder release valve, which would both drain the brake cylinder and release the automatic parking brake 100.

The manual release lever 155 can be provided for use where release without air is necessary or desired. The handle of the manual release lever 155 can be made accessible from either side of the car. The manual release lever 155 can require only a momentary pull on the handle with relatively little force, which can be accomplished by a person standing on the ground next to the rail vehicle. The required force is similar to the pull required on the present brake cylinder quick release valve.

The parking brake 100 could also be provided with a brake on/off indicator (not shown), which can be positioned such that it is readily visible from either side of the rail vehicle.

Force calculation data indicates that if the tension member 130 is allowed to pass over dead center by 0.020 inch, the end will be held against a stop on the actuator piston push rod (possibly located in the cylinder head for ease of adjustment) by a force of approximately 30 pounds. The manual latch release lever 155 shown can have about a five to one ratio. Thus, a six pound pull on the manual latch release lever 155 can trip the mechanism 154, releasing the parking brake, while maintaining basic simplicity.

A provision for manual release of the parking brake 100 can be required because of the necessity to switch cars without air. In order to do this when an emergency air brake application is in effect, a train operator must walk the train pulling release rods on each car to be switched. If an emergency application, which usually made when the road engine is cut off, is to set the locking devices on all of the cars, the locking devices should also be releasable at the same time and with the same effort as the air brake application that set them. Ideally, the manual release lever 155 would be located either next to, or tied in with, the conventional release valve handle. When the manual release lever 155 is pulled, it could be designed to effect both a release of the clamp 114, or other mechanical blocking device as may be described hereinafter, and reset any air controls used to operate the blocking device so as to avoid the possibility of stuck brakes and attendant wheel damage.

Figure 12:
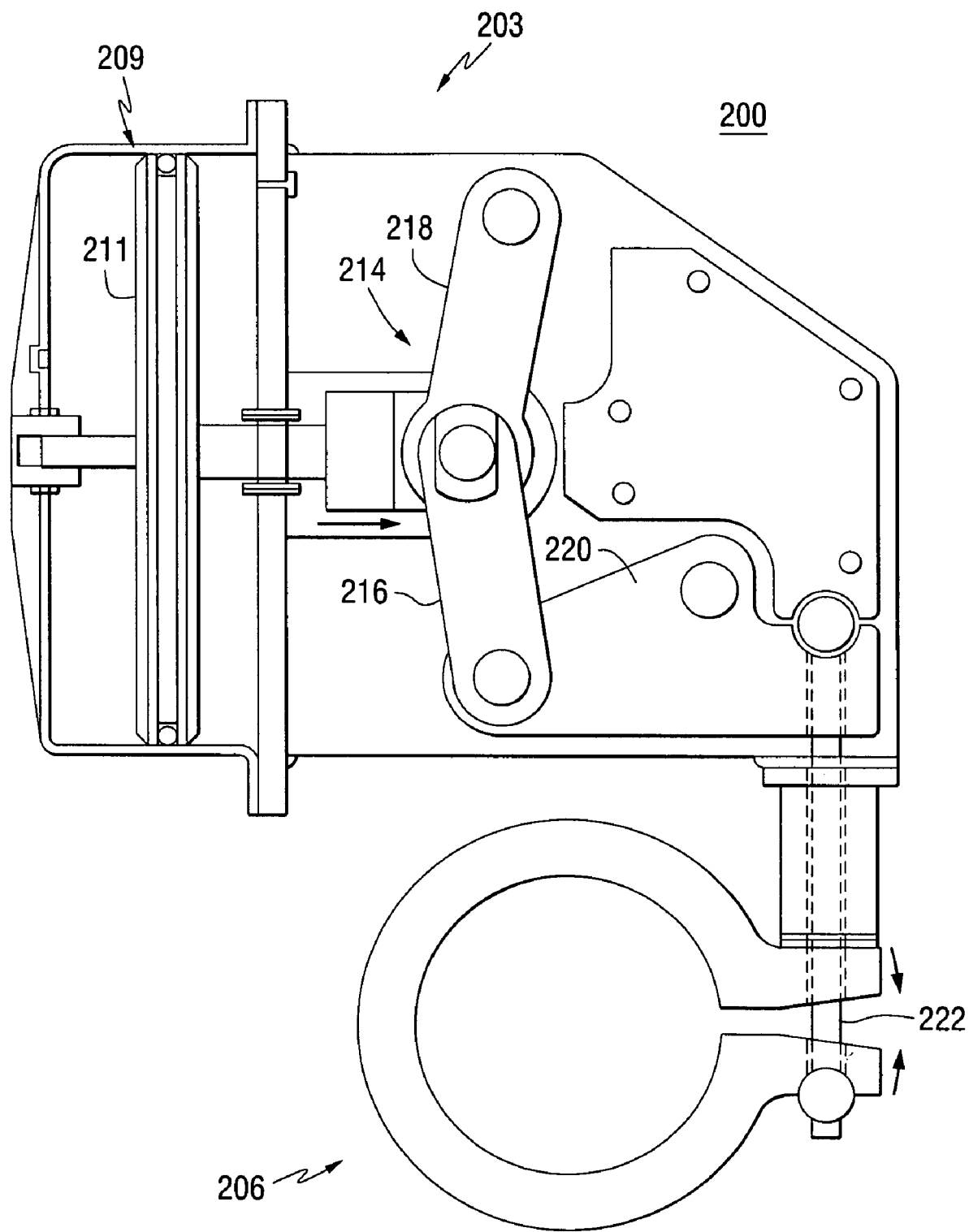
FIG. 12 is a side view of another embodiment of an automatic parking brake according to the invention.

Referring now to FIG. 12, in an alternative embodiment of a parking brake 200, similar to the embodiment of the parking brake 100 illustrated in FIGS. 4 through 11, can also employ a clamp ring 206 for gripping the piston push rod, but can employ an alternative actuator mechanism 203 for opening and closing the clamp ring 206. In this embodiment of the parking brake 200, the actuator 203 can also be a short travel pneumatic cylinder 209 enclosing a double acting piston 211 which is connected to a differently configured over-center lever arrangement 214. This lever arrangement 214 has a lower lever member 216 and an upper lever member 218 wherein one end of each of the lever members 216, 218 is pinned to each other and the end of the double acting piston 211. The opposite end of the upper lever member 218 can be pinned to a housing portion of the actuating mechanism 203, and the opposite end of the lower lever member 216 can be pinned to a link 220. The link 220 can be pinned at a central portion thereof to, for example, the housing of the actuating mechanism 203, and can have another end thereof connected to a rod 222 which opens and closes the clamp ring 206. Movement of the lever members 216 and 218 by the double acting piston 211 causes the lower lever member 216 to rotate the link 220 about the point at which it is pinned to the actuating mechanism 203, which causes the end of the link 220 to open and close the clamp ring 206 about the push rod, via the rod 222. Except for the configuration of the actuating mechanism 203 and lever arrangement 214 for opening and closing the clamp ring 206, this embodiment of the parking brake 200 can otherwise function in the same manner as the parking brake 100 described previously.

Operation

According to a preferred manner of operating the automatic parking brake 100 and/or 200, the pneumatic actuator can be pressurized on the application side with brake cylinder pressure, and on the release side with brake pipe pressure. The clamp ring could be designed to automatically grip the push rod only when brake cylinder pressure exceeds brake pipe pressure by a predetermined amount, which normally occurs only following an emergency brake application. For example, the parking brake actuator can be automatically activated by the exhaust of brake pipe and the development of full emergency brake cylinder pressure, causing the clamp ring to be tightened (and automatically locked) around the push rod, thereby holding the push rod securely in, for example, a fully applied position. In this manner, the clamp would not be actuated so long as the brake pipe remained substantially charged. Additionally, timing chokes could be employed to ensure that the clamp would not be applied until well after the brake cylinder has reached full emergency pressure. Normally, sufficient time will have elapsed to permit the train to be stopped. For example, the automatic parking brake can be designed to automatically clamp the push rod about one minute after an emergency brake application is made. In general, the intent is that whenever an emergency brake application is implemented, after a sufficient period of time has passed to stop the train, the differential pressure between brake cylinder and brake pipe will act on the opposite faces of the double acting piston and force the closure of the clamp ring about the push rod.

Effective Holding Power (NBR)

Tests on actual cars have shown that over 85% of the full emergency braking force can be reliably retained by the rigging clamp, even if the BCP is exhausted completely. By retaining in excess of 85% of the emergency braking force, the effective net braking ratio (NBR) for the parking brake will be slightly higher than the design NBR for the car, because the emergency BCP must be 15% to 20% higher than the full service pressure that the design NBR is based on. Therefore, as long as the design NBR exceeds 11%, which is the new minimum requirement for all cars, the effective NBR for the parking brake will exceed the AAR minimum requirement of 11% for conventional handbrakes.

Therefore, on new cars operated at 90 psi, the effective parking brake NBR should always exceed 11%. For retrofit applications to older cars having a lower design NBR, the parking brake would most often have an effective NBR of at least 9.5%. In the worst case, based on cars that just met the old minimum NBR requirement of 6.5% at 50 psi, the parking brake would still exceed 8.5% for a 90 psi emergency.

These lower net braking ratios on retrofits should be fully acceptable, because individual automatic parking brakes would not necessarily need to have as much holding power as the conventional handbrake. Provided all cars in a given train were equipped with the parking brake, 100% of any group of such cars would automatically be braked when parked. This far exceeds the percentage of handbrakes that typically need to be tied down. Looking at it from another perspective, an effective NBR of 8.5% would be more than sufficient to statically hold a loaded car on a 3.5% grade. Finally, in rare instances where such cars might need to be left on even steeper grades, or where operating pressures might be well below 90 psi, operating rules could still call for the use of the conventional handbrake.

It is also significant that cars are most often parked on grades of less than 1%, and on a 1% grade a 2.3% effective net braking ratio would be sufficient to hold a car. If all equipped cars in a given cut were braked at 11% or above, only 20% or one out of five of the cars would need to be equipped in order to assure holding the cut. The significance of this is simply that in a conversion program, the economic benefits could be reaped well before all cars in the given fleet were equipped.

In regard to holding power, anytime a train encounters a problem that leads to an unplanned stop on a grade, automatic parking brakes would provide a most efficient means for securing the train. It would not be necessary to walk the length of a train on an uphill grade in order to set up handbrakes on the downhill end. The automatic parking brake would also minimize the loss of braking force on individual cars that could occur due to any amount of brake cylinder pressure leakage following emergency applications, limiting such loss to 10% to 15%. In essence, the parking brake would provide an automatic mechanical backup to the pneumatic emergency brake with no time limit on the duration of its effectiveness.

Once closed, the clamp effectively locks in a very high percentage of the net shoe force generated by the full emergency brake cylinder pressure. Similar to a properly tightened conventional handbrake, this force can be retained indefinitely, even if the brake cylinder pressure completely leaks off. The automatic parking brake can also be designed to automatically release the clamp when the brake pipe pressure is restored and any remaining brake cylinder pressure is exhausted during release of the emergency application.

In a runaway situation, the parking brake can be applied as a mechanical backup to prevent a significant loss of braking force due to possible leakage. Emergency equalization pressure will not be materially affected, because the small size and short stroke of the pneumatic parking brake actuator constitutes a very small additional volume relative to the brake cylinder and the 6000 cubic inch combined reservoir. For example, in an embodiment of the invention, the pneumatic brake actuator cylinder can have a diameter of about six inches, and the piston stroke can be about 1.025 inches.

The parking brake will normally be released prior to moving cars, for example, either automatically by recharging the brake pipe, or manually by using a manual release lever. However, cars may also be moved short distances without harm without releasing the parking brake, even if they are empty. According to recent AAR net braking ratio requirements, almost all new freight cars will require an appropriate empty/load equipment. Because the parking brake force is initially derived from emergency brake cylinder pressure, it will be proportioned by the empty/load equipment when the car is empty or lightly loaded. Therefore, if such cars are dragged without releasing the parking brake, the wheels will not normally slide. Only if a car were parked loaded and then emptied could the brake holding force be sufficient to slide wheels.

Figure 13:
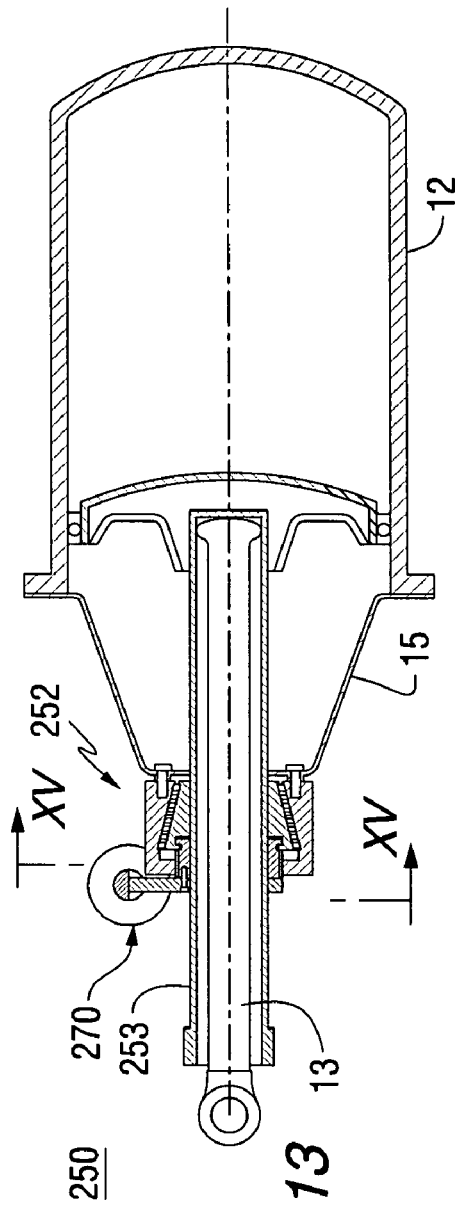
FIG. 13 is a cross-section view of a further embodiment of an automatic parking brake according to the invention.
Figure 14:
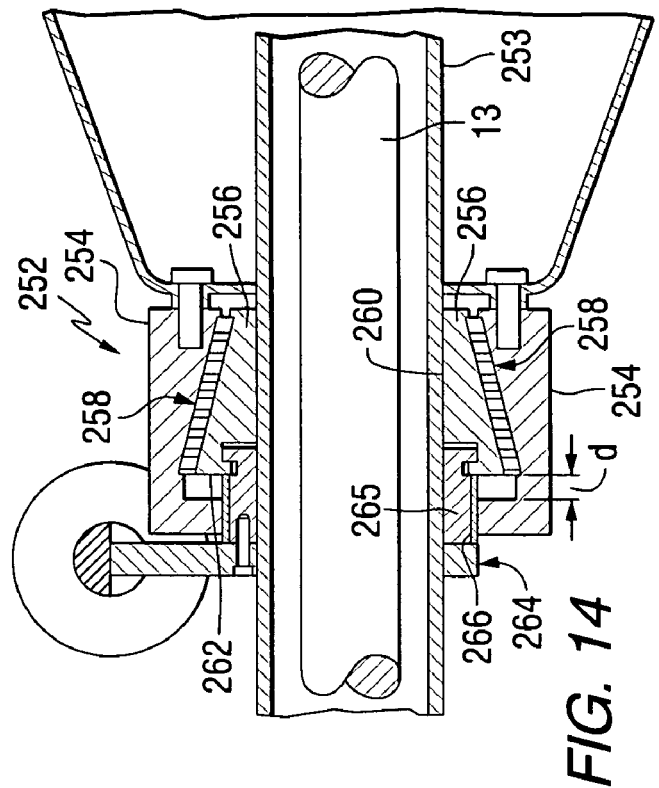
FIG. 14 is an enlarged section view of a portion of the embodiment shown in FIG. 13.
Figure 15:
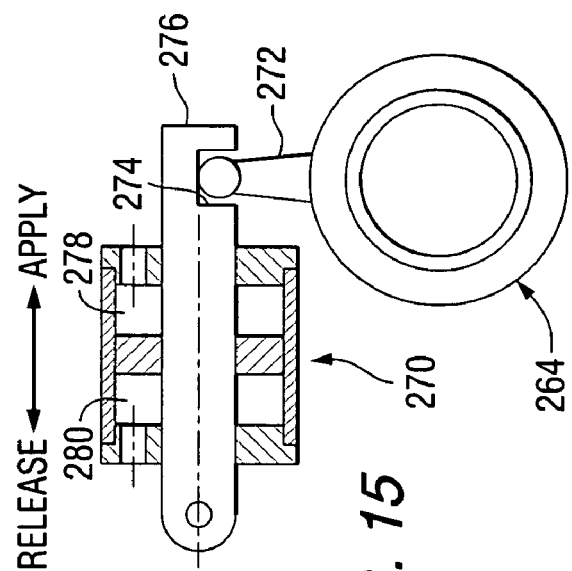
FIG. 15 is a view partially in section taken along line XV-XV in FIG. 14.

Referring now to FIGS. 13-15, a further embodiment of a blocking device 250 is shown in the form of self-actuating a collet assembly 252, which can be mounted to the brake cylinder 12 and around the push rod 13, or around a housing 253 which surrounds the push rod 13. The push rod 13 and the housing 253 move together. The collet assembly 252 can generally permit housing 253, and thus the piston push rod 13, to extend to apply the brakes on the rail vehicle, but grips the housing 253 to prevent retraction, and thus prevent a release of the brakes. The housing, 253 can be engaged by the collet assembly 252 in this embodiment, which eliminates the need for the separate ratchet bar used in the previous embodiments. As shown best in FIG. 14, the collet assembly can include outer 254 and inner 256 adjacent collet jaws which permit the housing 253, and the push rod 13, to extend in a first direction, so as to apply brakes on the rail car. However, the self actuating collet jaws 254, 256 cooperate automatically grip the housing 253 and block retraction of the housing 253 and piston push rod 13 responsive to movement of the housing 253 in the opposite direction to release the brakes. As shown, for example, the outer collet jaw 254 can be mounted on the non-pressure head 15 of the brake cylinder 10 and can circumscribe, generally enclosing, the inner collet jaw 256. Needle bearings 258 can be provided between the outer 254 and inner 256 collet jaws to reduce friction therebetween so that relative movement therebetween results in primarily in the creation of normal forces between the adjacent surfaces. The inner and outer collet jaws cooperate to form a locking portion as will be described in more detail below. The inner collet jaw 256 has an inner bore 260, which can comprise a guide member in this embodiment, and has one end 262 which can be connected to a collet nut 264. The collet nut 264 can have a sleeve portion 265 with a bore coaxial with the inner bore 160 in the inner collet jaw 256. The sleeve portion 265 can extend through an opening 266 in the outer collet jaw 254. The sleeve portion of the collet nut 264 can have external threads which engage internal threads on the opening 266 through the outer collet jaw 254, such that rotation of the collet nut 264, and thus the sleeve portion 265, results in axial movement of the collet nut 264 and thus the inner collet jaw 256. The connection between the sleeve portion 265 and the end 262 of the inner collet jaw 256 can be designed such that the inner collet jaw 256 does not rotate with the sleeve portion 265. Rather, rotation of the collet nut 264 results in axial movement of the inner collet jaw 256 along the piston push rod 13, in the direction of piston extension—away from engagement with the outer collet jaw 254. This releases the housing 253 from being gripped by the collet jaws 254, 256. Sufficient space "d" can be provided within the outer collet jaw 254 for the inner collet jaw 256 to move axially away from engagement with the outer collet jaw 254, so as to provide minimal resistance between the inner bore of the inner collet jaw 256 and the piston push rod 13 to permit a release of the housing 253. Accordingly, the housing 253 and push rod 13 are permitted to extend to apply the brakes when the brake cylinder 12 is pressurized. However, if the housing 253 begins to retract, the inner collet jaw 256 is carried back, albeit for a short distance, as provided within the outer collet jaw 254, until the oppositely tapered jaws of the inner 256 and outer 254 collet jaws come into contact and block further retraction. To release the housing 253 and permit retraction of the push rod 13, the collet nut 264 can be rotated, drawing the inner collet jaw 256 axially forward, thereby releasing the engagement of the inner 256 and outer 254 tapered collet jaws. This releases the pressure on the housing 253 and permits push rod 13 to retract and the brakes to be released. In accordance with the foregoing description, movement of the inner collet jaw 256 carried by the housing 253, in a direction to release the brakes, engages and tries to expand the outer collet jaw 254, thereby creating force between the collet jaws 254, 256. Since the outer collet jaw 254 is designed to be generally rigid, this force acts on the inner collet jaw 256, which is designed to permit some compression, the result is the in creation of pressure end between the inner bore of the inner collet jaw 256 and the housing 253. This pressure creates friction between the inner bore 260 of the inner collet jaw 256 and the housing 253 which essentially stops the housing 253, and thus the piston push rod 13, from retracting any further.

Referring now to FIG. 15, a collet operating cylinder 270 can be provided for selectively rotating the collet nut 264 to grip and release the housing 253. An arm 272 extending from the collet nut 264 can be captured via a notch 274 in a linkage portion 276 associated with the operating cylinder 270. The operating cylinder 270 can be selectively operated to translate the notched linkage 276 to rotate the collet nut 264 in opposite directions to cause the collet jaws 254, 256 to engage or release the housing 253. The operating cylinder 270 can be remotely controlled to activate and deactivate the self-actuating gripping action of the collet jaws 254, 256. As illustrated, for example, the operating cylinder 270 can have internal chambers 278, 280 which can be connected to a source of pressure, such as a compressed air source, whereby pressurization of one or the other internal chambers 278, 280 causes the collet nut 264 to rotate in opposite directions to cause the collet jaws 254, 256 to release the housing 253, or to position the inner collet jaw 256 to grip the housing 253 upon retraction.

As explained previously, this blocking device 250 can be easily adapted for use with a brake cylinder on either the car or truck mounted brake systems shown in FIGS. 1-3. Irrespective of the specific design, the basic operating principle of an automatic parking brake, or blocking device, according to the invention is that whenever the pneumatic brake is applied, and perhaps more desirably after an emergency brake application, a blocking device can be implemented to prevent release of the rail vehicle brakes. This can be accomplished, as described above, by blocking the ability of the brake cylinder piston push rod, or the brake rigging, to move to a release position. The blocking device can be selectively turned on or off, or can be activated automatically by movement of the piston push rod, to block retraction of the push rod despite a loss of brake cylinder pressure. Release of the blocking device can also be implemented automatically, for example responsive to restoration of brake pipe pressure, or manually at each car via provision of a manual release rod similar to the brake cylinder release rod of existing AAR standard freight car brake equipment. However, the automatic blocking device not designed to be operated manually, such as to hold cars during switching operations without air, for example. Consequently, a conventional handbrake can still be necessary for this purpose, and for the purpose of controlling the speed of rail cars in rider humping operations, as still used in some locations to bring cars through coal tipples.

Figure 16:
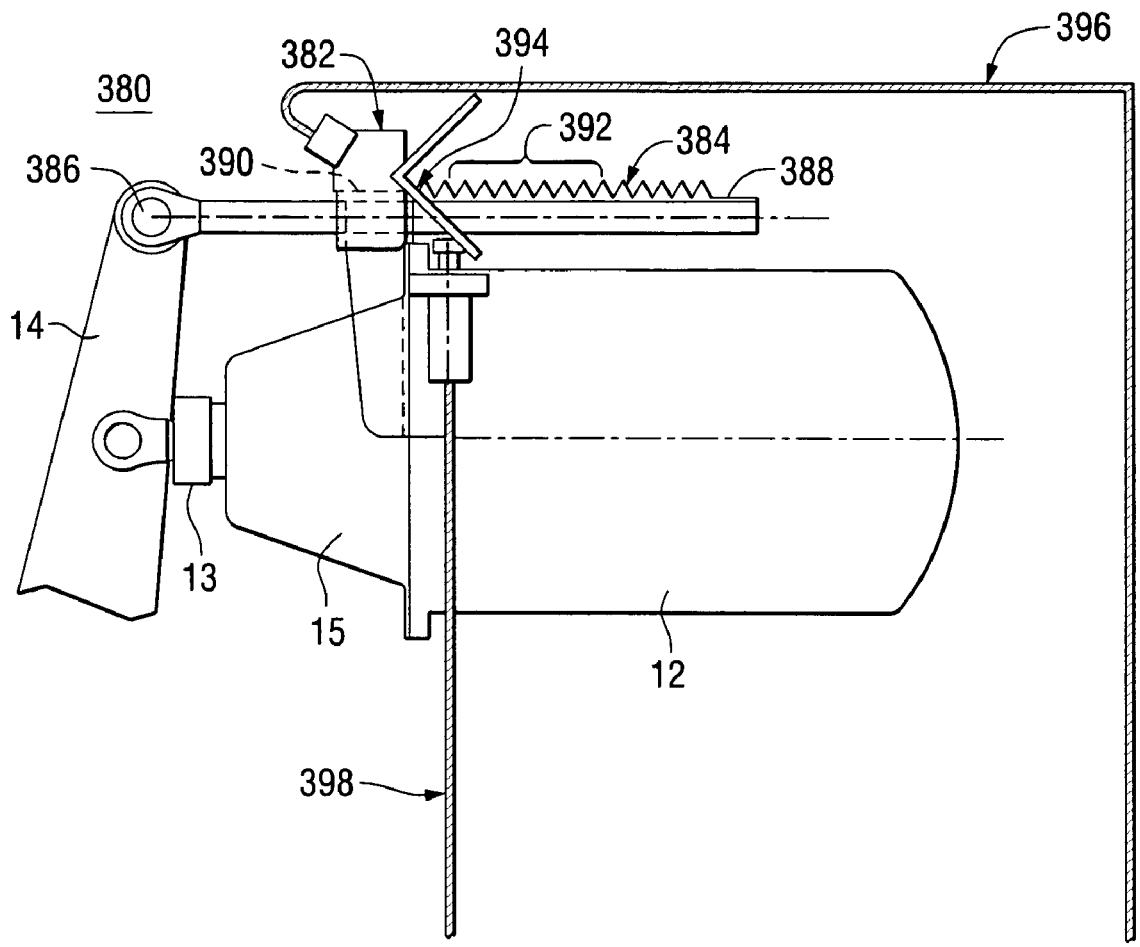
FIG. 16 illustrates a further embodiment of an automatic parking brake according to the invention.

FIG. 16 illustrates another embodiment of the invention, wherein the automatic parking brake 380, also referred to herein as a "blocking device," can be positioned on the brake cylinder 12 and connected to an extension of the cylinder force transfer lever 14 beyond the piston push rod 13, or at any point where the position of the cylinder force transfer lever 14 can be blocked. This would not include the slack adjuster 16, as it is essentially a fixed link in the brake rigging and does not necessarily change its length at all in response to brake application and release operations. For illustration purposes, the blocking device 380 is shown mounted to the non-pressure head 15 of the brake cylinder 12 of a car mounted brake system 30 shown in FIGS. 2 and 3. However, those of ordinary skill in the art will recognize that the blocking device 380 could also be similarly positioned on the brake cylinder assembly 70 (see FIG. 2) and connected to an extension provided on the cylinder force transfer lever 64 of the truck mounted brake system 30.

As illustrated, the blocking device 380 can include a sleeve or guide member, which in this case, can be part of a control box 382, that can be mounted on the non-pressure head 15 of the brake cylinder 12. A rod member, such as a ratchet bar 384, can be slidably disposed through the guide member 380. A first end 86 of the ratchet bar 384 can be connected to the brake rigging, such as the transfer lever 14 as shown, whereas a second end 388 is slidingly received through an opening 390, or guide portion, of the control box 382. A locking member can be provided which permits extension of the push rod while automatically preventing retraction subsequent to such extension. For example, the second end 388 of the ratchet bar 384 can be provided with a plurality of notches 392 extending along the length of the bar 384 for engaging a locking portion, or ratcheting member 394. In accordance with the well known functioning of ratcheting systems, the locking portion 394 can be designed to permit extension of the ratchet bar 384 in one direction, as the piston push rod 13 extends from the brake cylinder 12 during a brake application, yet prevent retraction of the ratchet bar 384 in the opposite direction, thus preventing retraction of the piston push rod 13 to release the brakes. Such ratcheting systems are well known to those of skill in the art, and the specific details of any particular type of ratcheting system are not necessary to a full and complete understanding of the invention.

It can be desirable to remotely control the release, and/or activation, of the blocking device 380. For example, as illustrated, the control box 382 can be plumbed to control, such as pneumatically, the ratcheting member 394 so as to selectively release or engage the ratchet bar 384. As explained, the ratcheting member 394 can automatically engage the ratchet bar 384 if it begins to retract, however, if it is not desired to have the ratcheting member 394 automatically engage the ratchet bar 384 on every brake application, the control box 382 can be designed to permit the blocking device 380 to be deactivated under certain conditions. For example, it may be desired that the blocking device 380 be engaged subsequent only to an emergency brake application. The control system thus can include both an application pipe 396 and a release pipe 398 for basically overriding the position of the ratcheting member 394 with respect to the ratchet bar 384.

Figure 17:
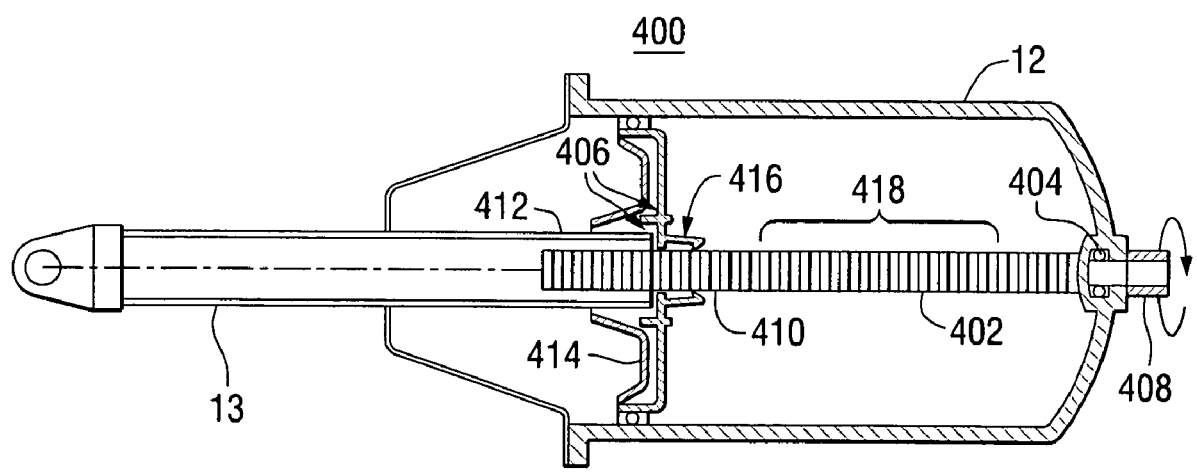
FIG. 17 is a cross-section view of a further embodiment of an automatic parking brake according to the invention.

An alternative embodiment of a blocking device 400 is illustrated in FIG. 17, wherein the blocking device 400 is configured to be positioned generally inside the brake cylinder 12, in manner a to prevent retraction of the piston push rod 13. Like the blocking device 380 in FIG. 16, this blocking device 400 can also be adapted to work in combination with a brake cylinder on either the car or truck mounted brake systems shown in FIGS. 1-3. As shown, the blocking device 400 can also employ a rod, or ratchet bar 402, which can be disposed within the brake cylinder 12. In this embodiment, the guide member can be a hollow portion of, or associated therewith, the piston push rod 13, or could comprise part of the opening through the piston face 414. Since the ratchet bar 402 is within the pressure head of the brake cylinder, appropriate sealing members 404, 406 can be employed to prevent loss of pressure both at the end 408 of the ratchet bar 402 which projects from the pressure head of the brake cylinder 12, and at the end 410 of the ratchet bar 402 which passes through the piston face 414 into the end 412 of the push rod 13. At least the end 412 of the push rod 13 can be hollow so that the ratchet bar 402 can remain axially located with respect to the push rod 13. When the push rod 13 is extended to apply the brakes on the rail vehicle, the ratchet bar 402 can be automatically engaged by a ratcheting member, or locking portion 416, positioned adjacent the piston face 414. Thus, the piston, and the push rod 13, are prevented from retracting to release the brakes. In this type of blocking device 400, disposed within the pressure head of the brake cylinder 12, one way to selectively control the engagement of the ratchet bar 402 by the locking member 416 is, as shown in FIG. 5, for example, to provide notches 418 on only a portion of the surface of the ratchet bar 402. The locking portion 416 can then be configured such that the notches 418 on the ratchet bar 402 can only be engaged if the ratchet bar 402 is rotated to a certain position. In this way, the locking portion 416 can be engaged and disengaged from the ratchet bar 402 by simply rotating the ratchet bar 402. Various types of control members can be designed to selectively rotate the ratchet bar 402 via the end 408 thereof which extends externally of the brake cylinder 12. The ratchet bar 402 can thus be configured with the notches 418 radially spaced about the circumference of the bar 402, such that varying degrees of rotation of the ratchet bar 402 can engage and disengage the locking member 416. The locking portion 416 can correspondingly be designed, and positioned, such that it the notches 418 be engaged unless the ratchet bar 402 is rotated to a position that brings the notches 418 into engagement with the locking member 416. For example, a 2, 4 or 6 sided rack would rotate into and out of engagement with the locking member 416 every 90, 45, or 30 degrees, respectively.

Any of the automatic parking brake embodiments described herein can be operated to apply the brakes on all cars in a train essentially simultaneously. This is a great improvement in the ability of the parking brake to hold a train on a grade without a locomotive, bringing about improved safety in operations. Likewise the elimination of the necessity for crewmen to apply handbrakes on cars when they are set out, or release them when cars are picked up, would both speed operations and reduce the number of wheels damaged by dragging handbrakes. If applied in a service where electrically controlled brakes were used, a further refinement can be to provide for a release of the automatic parking brake independent of brake pipe restoration. This can be done to permit charging of trainlines while safely holding the cars in the train. Furthermore, since the high force and energy necessary to apply the parking brake is provided by equipment that is already part of the car, the cost of a simple holding mechanism could be minimal, which would encourage the widespread adoption of such blocking devices.

Assuming that the blocking device was located either on or beyond the centerline of the brake cylinder, the maximum force that would be likely imposed would be slightly less than the emergency brake cylinder force from a 90 pounds-per-square inch ("psi") brake pipe fully charged system. Ignoring release spring and seal friction, which would reduce the amount to be held thus giving some conservatism to this calculation, this force, for a 10 inch brake cylinder, would be 6005.25 pounds.

As air pressure in the brake cylinder is reduced after an emergency application, the piston will begin to withdraw, and load will be imposed on the blocking device. This is true even where the blocking device is a collet as shown in FIGS. 13-15, gripping the piston push rod in the non-pressure head of the convention brake cylinder. In such a case, the metal of the non-pressure head, and the collet's axial supporting parts would be loaded, with attendant axial deflection, moving the piston toward release, though likely not very far in such a case. The actual force held will be less than the maximum by the amount of the piston push rod withdrawal multiplied by the spring rate of the rigging. For a conventional rigging, this spring rate, at the push rod, is on the order of 1000 pounds per inch. Thus, if the piston relaxed by a quarter of an inch, the effective piston force for calculation of parking brake effectiveness would be 6000−(1000×0.25)=5750 pounds.

With the amount of relaxation known for a particular design, and a reliable minimum rigging spring rate, parking brake effectiveness can be calculated. For example, using the following assumptions: a relaxation of ¼ inch, a spring rate 1000 pounds per inch, brake cylinder pressure of 63.73 psi (service equalization from 90 psi), and a 10 percent actual braking ratio at that pressure would result in a theoretical piston force of 63.73×0.785×100, i.e., 5002.8 pounds. Piston force held after relaxation from an emergency application would be, for example, 5750 pounds. Thus, expected parking brake effectiveness would be 5750/5002×10%=11.49%. From this, it would appear that a blocked rigging parking brake has the potential to be practical. Net braking ratios of more than 10 percent are under discussion and would provide more leeway for the practicality of the blocked rigging parking brake.

Figure 18:
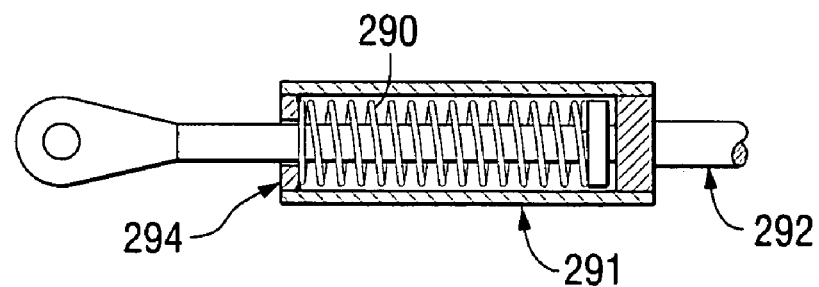
FIG. 18 is a section view of an embodiment of a resiliently compressible member utilized according to the invention to soften the brake rigging.
Figure 19:
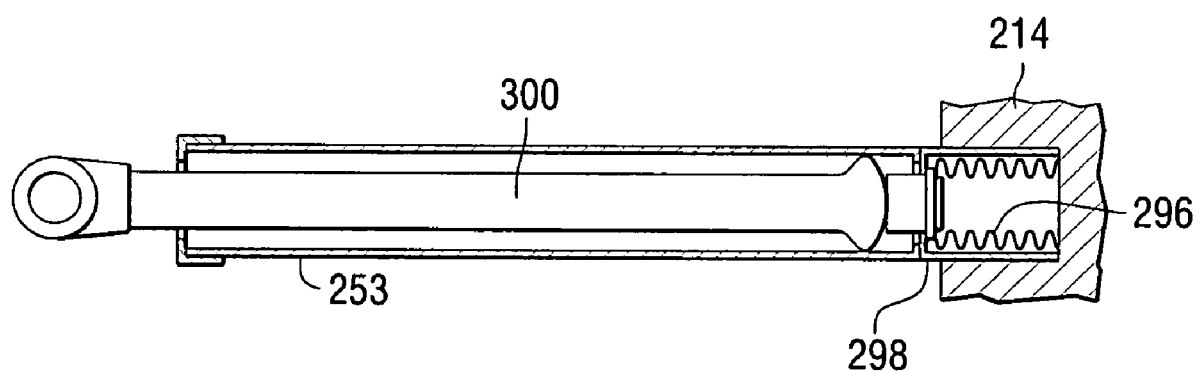
FIG. 19 is a section view of another embodiment of a resiliently compressible member utilized according to the invention to soften the brake rigging.

In the event that brake rigging stiffness was higher than above, or relaxation greater, it could be desirable to soften the rigging near the maximum load with a preloaded high rate spring provided in the brake system. Examples of different embodiments of resiliently compressed members, such as preload springs, which can be appropriately positioned in the rail vehicle brake system are illustrated in FIGS. 18 and 19. The preloading spring can be, for example, formed from a stack of Belleville washers. FIG. 18 shows the spring 290 carried in a fitting 291, which can be welded to the slack adjuster tail rod 292. In the case of a clamp or collet type embodiment, the spring 296 could be carried in a hollow base portion 298 associated with or connected to the hollow rod 253, using a shortened push rod 300, as shown in FIG. 19.

Pneumatic control of an automatic parking brake as described herein can be designed to function, for example, as outlined in Table 1 below:

TABLE 1

PNEUMATIC OPERATIONS

| CONDITION | ACTION REQUIRED |
|---|---|
| Release and charging. | release the parking brake when brake pipe pressure exceeds a predetermined pressure, for example, 50 psi, and charge an actuating reservoir if provided. |
| Service, including all service brake related functions, (initial service, full service, lap, Q.S., service accelerated release, etc.). | Parking brake should have no effect on rigging operation, and remains released. |
| Emergency | Parking brake should lock the push rod at maximum rigging travel automatically, or approx one minute after application, and should require no air pressure to maintain this condition. |
| Handbrake Application | Parking brake, if applied, should not interfere with increase of brake effort caused by handbrake.<br>Parking brake, if released, should not interfere with handbrake application, nor be activated by thereby. |
| Handbrake Release | Parking brake, if applied, should not release with handbrake.<br>Parking brake, if released should not interfere with full release of handbrake. |
| Manual Parking brake release | Should release parking brake and reset pneumatic actuator to release and charging condition. |
| Emergency Release | Identical to Release and charging |

Referring now to FIGS. 20-26 an embodiment 400 of a combined manual release and status indicator for an automatic parking brake is illustrated, such as the automatic parking brake 100 in FIG. 4 described hereinabove. The manual release and status indicator combines the two functions, release and status indicator, into a single device, resulting in a system of both great simplicity and practical application. Only two items are required to fit an automatic parking brake actuator with the proposed system, which are described in hereinafter.

Figure 20:
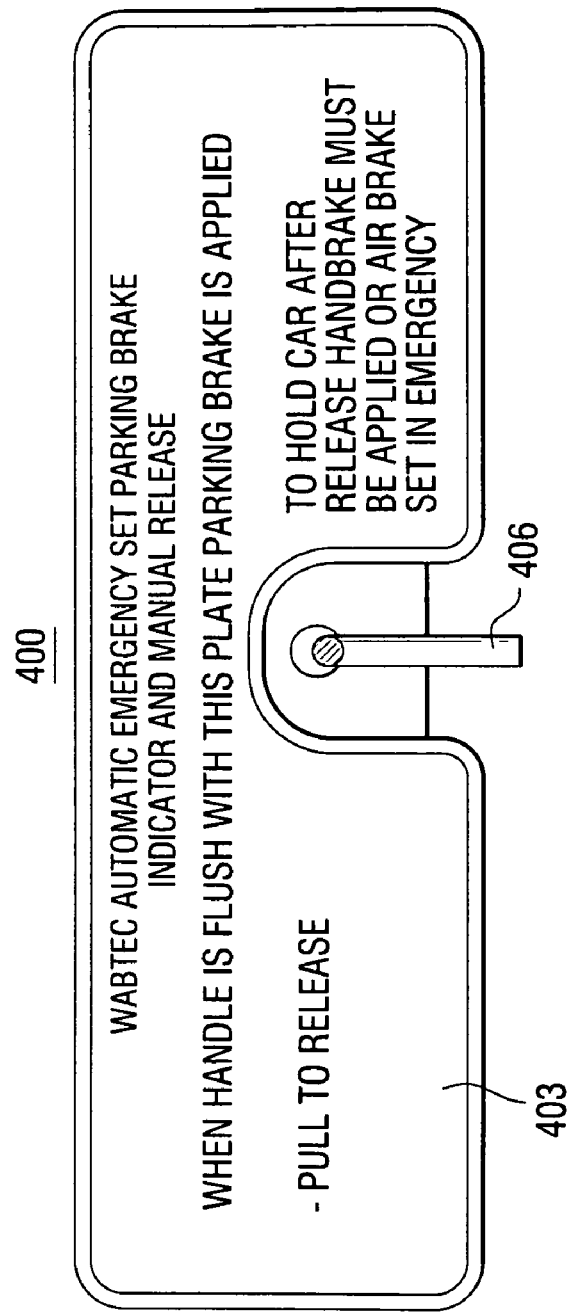
FIG. 20 is a front view of an embodiment of a manual release device operating station according to the invention.
Figure 22:
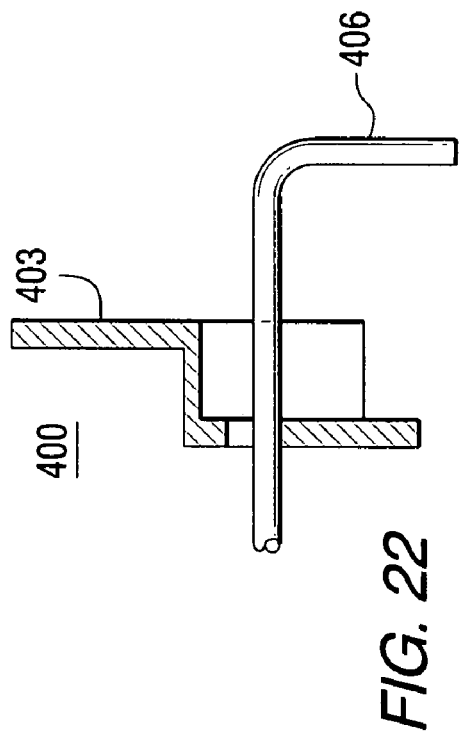
FIG. 22 is a side view of the operating station shown in FIG. 20 showing an indicator handle in the release position.
Figure 21:
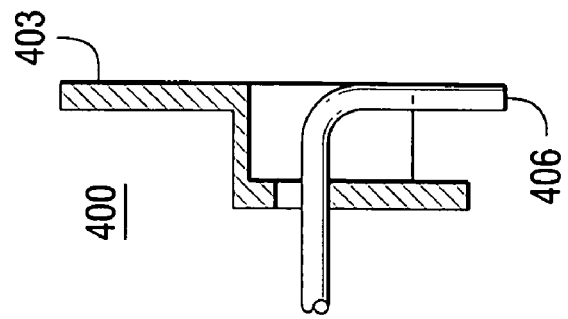
FIG. 21 is a side view of the operating station shown in FIG. 20 showing an indicator handle in the applied position.

The first of the two items required is the operating station, including a face plate and a manual release handle, as shown in FIG. 20. FIG. 21 shows the operating station device as it would appear on a car after an emergency brake application, with the handle in the applied position, i.e., flush with the face plate of the operating station. FIG. 22 shows the handle in the release position, extending out away from the face plate of the operating station, as when the brakepipe is charged, or after manual release.

The second item necessary for implementation of the system is the indicator/release rod positioner assembly, which is shown in FIGS. 23-25B. In particular, FIG. 23 is a cross section view through a rail car body 411 equipped with an automatic parking brake ("APB"), and shows the arrangement of left and right side operating station face plates 403 and release handles 406 relative to the APB equipped brake cylinder. Also shown are control, or indicator, rods 413 connecting an operating lever 416 of a positioner assembly 410 to each of the left and right side release handles 403.

Figure 24A:
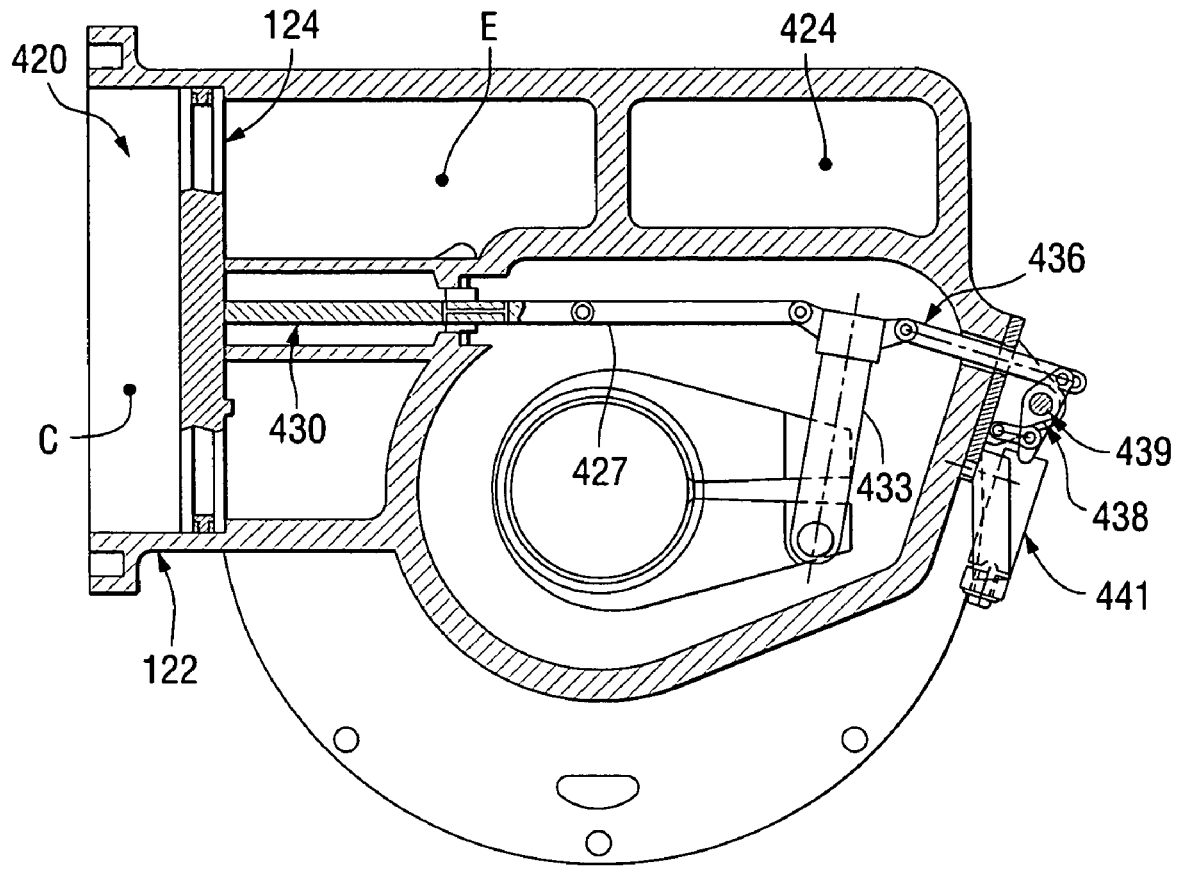
FIG. 24A is a cross section view of the automatic parking brake and manual release and indicator system such as shown in FIG. 23, shown in a release position.
Figure 24B:
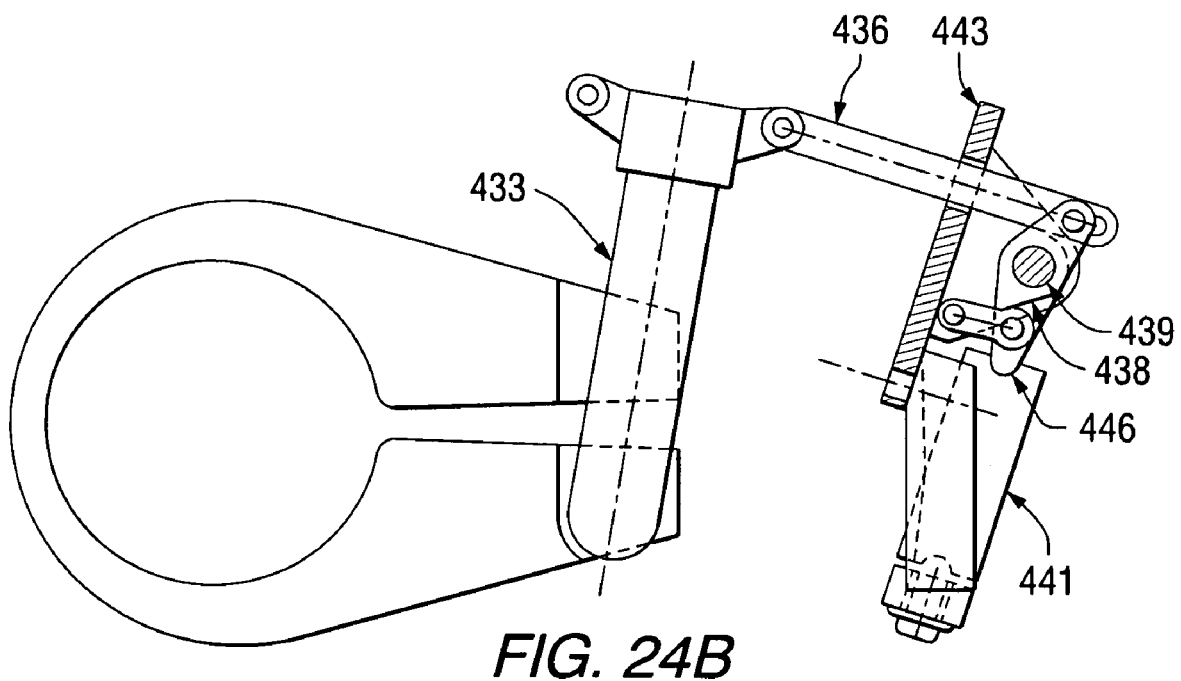
FIG. 24B is a detail view of an embodiment of a positioner mechanism of the manual release and indicator system such as shown in FIG. 24A.

The operation of the positioner assembly 410 can be better understood by referring to FIGS. 24A and 24B. FIG. 24A is a cross section through the actuator cylinder 122 of the APB 100 and the positioner assembly 410, also showing chamber C which acts on the brake pipe side 420 of the piston 124, application chamber E, and a timing chamber 424. FIG. 24B is a detail view of the positioner assembly/mechanism.

As shown in the figures, an embodiment of the positioner assembly 410 includes an actuator link 427 operatively connected between the actuator piston rod/stem 430 and the clamp operating toggle 433. A detent link 436 is connected between the clamp operating toggle 433 and a combined operating link and detent cam 438. The operating link/detent cam 438 is connected to the operating lever 416 via a positioner shaft 439, which can be an end portion of the positioner rod 413. Additionally, a detent spring and roller assembly 441 is provided associated with the operating link/detent cam 438.

As shown in more detail in FIG. 24B, a positioner body 443 operatively associates the combined operating link/detent cam 438 with the other elements of the positioner assembly 410, including the detent spring and roller assembly 441.

The positioner assembly operates as an indicator in response to the position of the actuator piston as described below, in correspondence with various operating conditions of the brake on the rail car.

Release And Charging

When the brakepipe is charged and air is supplied to the actuating piston 124, the piston 124 is forced to the right by the pressure acting on the left hand face thereof; This travel will force the clamp operating toggle 433, to which the piston 124 is linked, clockwise to the release position shown in FIG. 24A. In this position, brake pipe air will also be admitted to chamber E, the application chamber, causing it to charge near or equal to the brakepipe pressure which is being supplied thereto.

Figure 25A:
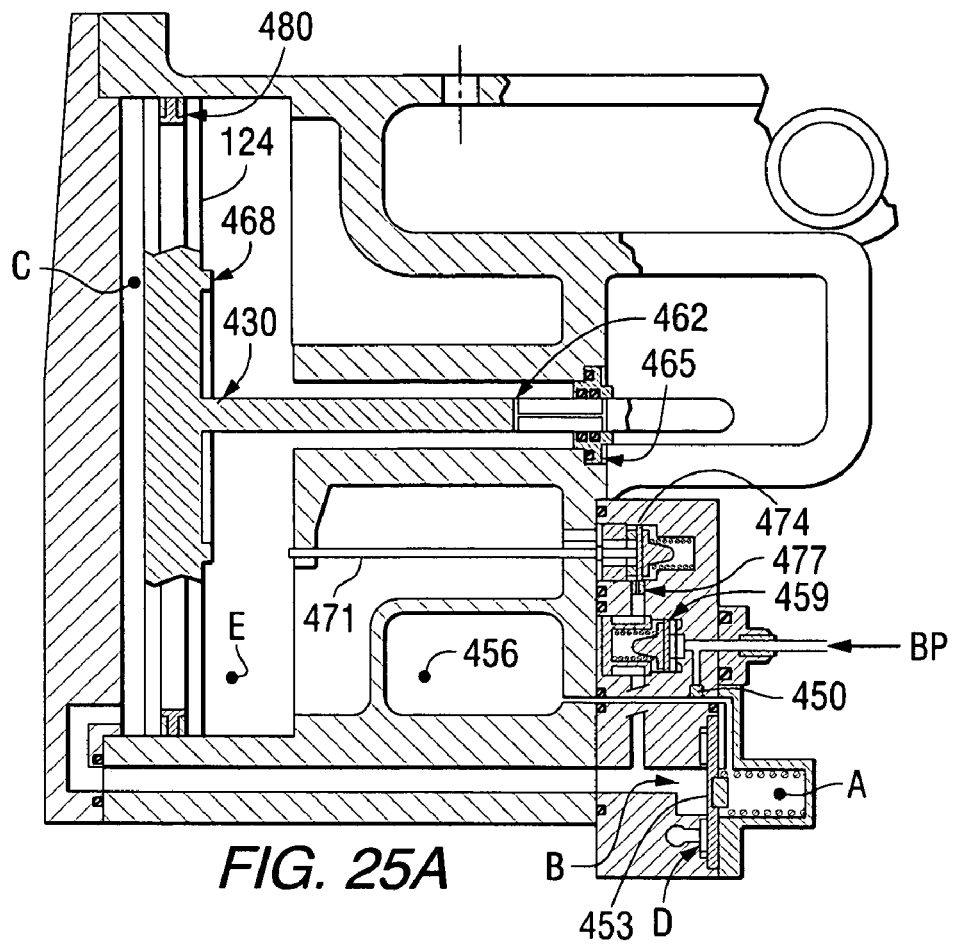
FIG. 25A is a cross section view illustrating a control diagrammatic for an automatic parking brake and manual release and indicator system such as shown in FIG. 23.
Figure 25B:
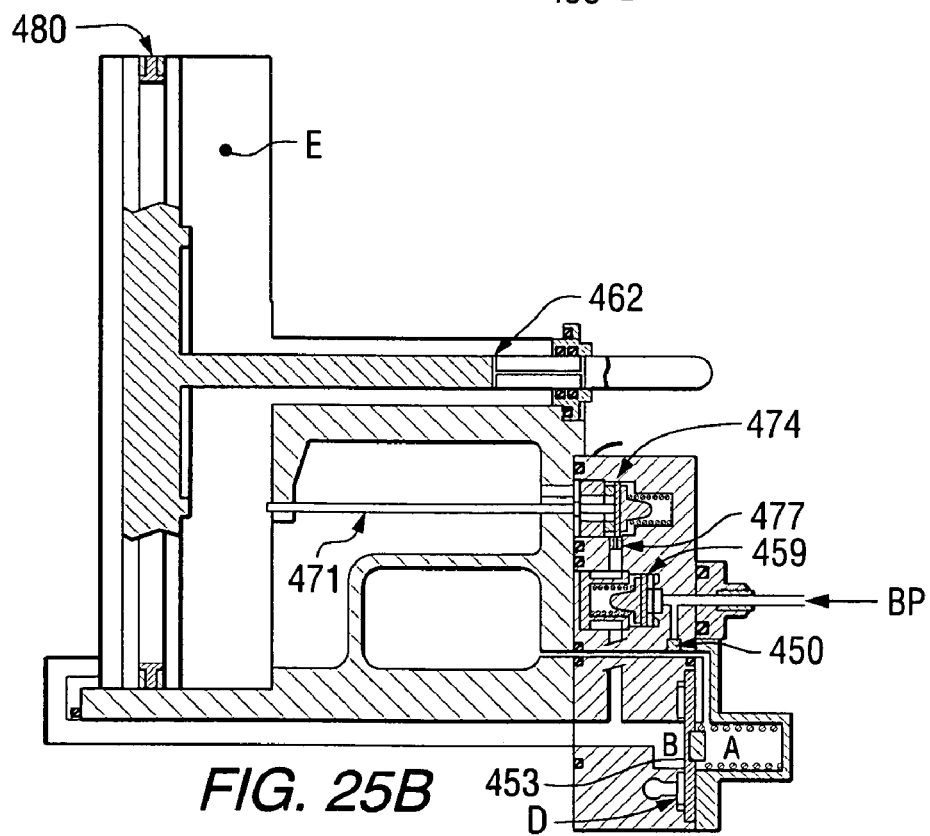
FIG. 25B is a detail view of the control diagrammatic in FIG. 25A.

The pneumatic control governing the charging and subsequent operation of the actuating piston 124 is shown in the control diagrammatic of FIG. 25A, which is a cross section view, and in FIG. 25B, which is a detail view. The operation of this control system will be explained in more detail below. Referring back to FIGS. 24A and 24B, the detent link 436 is connected to the clamp operating toggle 433, thus when the toggle 433 rotates to release position the detent link 436 forces the combined operating lever/detent cam 438, to which it is connected, to rotate clockwise to a position beyond the maximum lift of the cam roller portion 446 of the detent spring and roller assembly 441; The detent spring force now acts to urge further rotation of the roller cam 446 in the clockwise direction, even in the event that the actuator piston 124 does not travel far enough to accomplish full rotation of the operating lever/detent cam 438 and the associated positioner shaft 439. Thus, movement of the detent cam roller 446 to a point beyond maximum lift (which point is itself beyond the travel necessary for the un-locking of the clamp) will assure that the positioner shaft 439 achieves full travel, and that the connected positioner rods 416 are both withdrawn fully into the flush position allowing an attendant to determine at a glance that the automatic parking brake is released.

Turning back to FIGS. 25A and 25B, when air is admitted to the port labeled BP it passes downward through the timing choke 450 and charges chamber A, above the diaphragm valve 453, and its connected timing volume 456. At the same time, BP air also lifts the charging check valve 459 from its seat and charges chamber C on the left hand side of the actuating piston 124 without restriction. The pressure to chamber C is also supplied to chamber B on the bottom of the diaphragm valve 453. However, even though the pressure in chamber B may be somewhat higher than that in chamber A during charging, the pressure differential is not great enough to overcome the spring of the application diaphragm valve 453, and the great difference in effective area of the two sides of the diaphragm valve 453, allowing the diaphragm valve 453 to remain seated during the charging process.

When the actuator piston 124 is moved almost fully to the right, an exhaust port 462 in the actuating piston stem 430, which previously has kept the application chamber E to the right of the actuating piston 124 connected to atmosphere, will be closed by the double O-ring gland 465. Further travel will bring a circular boss 468 on the right hand piston face in contact with the end of the admission valve operating rod 471, moving this rod 471 to the right and forcing the admission valve 474 open. In the open position, the application chamber E will charge to the same pressure as chamber C, storing the energy that will later be used to move the clamp operating toggle 433 to apply the brake clamp.

Charging will continue in this way until the rail car brake system is fully charged, at which time the position of the actuating piston will remain as shown in FIGS. 24A and 24B, with nearly full brake pipe pressure on both sides of the piston.

Service Brake Application

When a service brake application is made, pressure to the BP port is reduced, but the charging check valve 459 keeps the air on both sides of the piston 124 bottled up, and the only effect that the service application has on the automatic parking brake is that the pressure in chamber A and the timing volume 456 drops to follow the reduced brake pipe pressure. Because the area of the application diaphragm valve 453 exposed to chamber A is much larger than that exposed to the bottled up application volume pressure acting in chamber B, a normal BP pressure reduction associated with service braking will not produce enough differential pressure of chamber B over chamber A to unseat the application diaphragm valve 453. Thus, a service brake application will have no noticeable effect on the condition of the released APB.

Service Brake Release

As shown in FIGS. 25A and 25B, when the pressure to the BP port is restored to the full release value any slight leakage of air from the charged volumes of the APB (which are connected to each other by the charging check valve 459 at all times in the release mode) will be replenished, but no other noticeable effect will result.

Emergency Brake Application

When the train air brake system is applied in emergency, the brake cylinder fully extends within fifteen seconds of the emergency application being sensed at the car. During this period, and for as long as forty seconds thereafter, the train is still moving. After about one minute however, the train will be stopped and, ideally, the automatic parking brake would by then be applied.

With the control scheme shown in FIGS. 25A and 25B, an emergency brake application results in an immediate drop in pressure to zero at the BP port. The immediate reaction by the APB to this is no change, because the same controls that keep operating pressure bottled up during a service application are in effect in this case as well, with one great difference, that being the action of the application diaphragm valve 453. The application diaphragm valve 453 is held to its seat during service applications because of its large differential area with chamber A acting on the entire area of the diaphragm, whereas chamber B pressure acts only on the area of the valve seat. In an emergency application though, the pressure differential, established by the timing volume 456 and attached chamber A blowing down through the timing choke 450, is more than high enough to overcome the area differential and permit the control pressure in chamber B to begin to unseat the application diaphragm valve 453. Once the application diaphragm valve 453 begins to open, the large area under the diaphragm, which is chamber D, experiences a rise in pressure which aids the initial differential over the full area of the diaphragm and causes the application diaphragm valve 453 to open fully, thereby connecting chamber C (on the left face of operating piston) directly to atmosphere. As soon as this happens, the piston 124 begins to move to the left and removes the force on the admission valve operating rod 471, allowing the admission valve 471 to close under the influence of a spring acting thereon.

Figure 26:
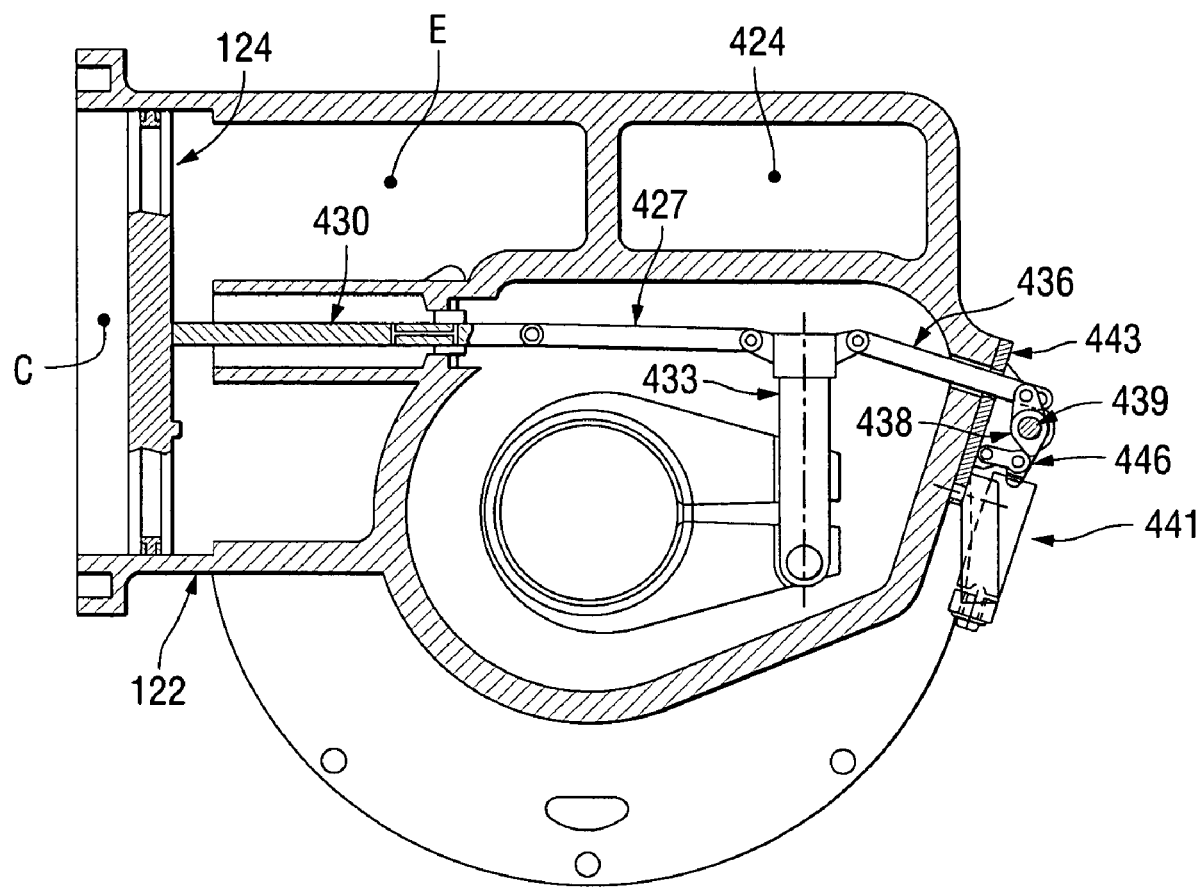
FIG. 26 is a cross section similar to FIG. 24A except shown in an applied position.

Therefore, as shown in FIG. 26, all of the air trapped in the application chamber E remains trapped and forces the piston 124 completely to the application, or applied, position. As the piston stem 430 approaches the applied position, the exhaust control port 462 will be drawn into the application chamber E, connecting it to exhaust through the restriction of the small diameter of the control port 462, thus assuring that when the piston 124 has moved to the application position, after a few minutes, the pressure in the application chamber E will dissipate. This assures that, when the air brake system is next recharged the full pressure of the BP will be available move the piston 124 to the right, returning it to the release condition shown in FIGS. 24A and 24B, thus releasing the automatic parking brake.

Referring back to FIG. 23 momentarily, the positioner rods 413 are fixed to the double ended positioner lever 416, so this torque will rotate the positioner lever 416 clockwise and force both release 406 handles out sufficiently (about 3 inches) from the face plate 403 of the operating stations 400, so as to be very visible to attendant personnel. The maintaining torque has been chosen to be high enough to prevent movement of the handles 406 toward the inward, or "applied," indication by vibration. Thus, when one looks at the operating station placard, i.e., face plate 403, one will see the handle 403 protruding and, upon reading the placard 406, will know the indicator's meaning as required.

When the parking brake is applied, there may or may not be brake cylinder pressure present. But normally, for several hours after an emergency application of brakes, there would be such pressure. In order to move cars without interference for switching purposes, yardmen at present must walk to each car in a train, and pull the brake cylinder release rod on each one. With the APB according to the invention, a second rod must also be pulled, the indicator/release rod/handle 406 will serve this function as explained below. Ideally car builders should be instructed to locate these two rods as close to each other as possible so as to make it both simpler for the yard personnel to see that there are two rods to be pulled, and easier to find them both.

When the APB has been set, both sides of the actuating piston 124 are connected to atmosphere, though the right hand face of the piston 124 will have pressure for a period of a minute or so as its volume of air bleeds off through a control orifice 477. Once this initial period has timed out, the operating lever/detent cam 438 will prevent accidental motion from impacts, etc., from causing the actuating piston 124 to move and possibly "knock off" the APB. However, when attendant personnel want to move the car without the APB applied, it is only necessary to pull on the release handle 403 if it is "flush" with the face plate 406. This is because, with no air on the system, the leverage of the operating lever 416 is great enough to multiply the applied force (by a factor of 12:1 or more) and overcome O-ring friction and the small amount of over-center clamping force holding the APB applied, and thereby move the actuator piston 124 to the right, releasing the clamp on the hollow piston rod.

When cars are subsequently spotted without air, handbrakes will have to be applied in the usual manner, but if their brake systems are charged when spotted, all that is necessary is to uncouple the car, close the angle cock on the consist still coupled to the locomotive, and move the coupled cars away from the just spotted one(s). This will set the air brake in emergency and return the APB to the applied position shown in FIG. 26.

Figure 27:
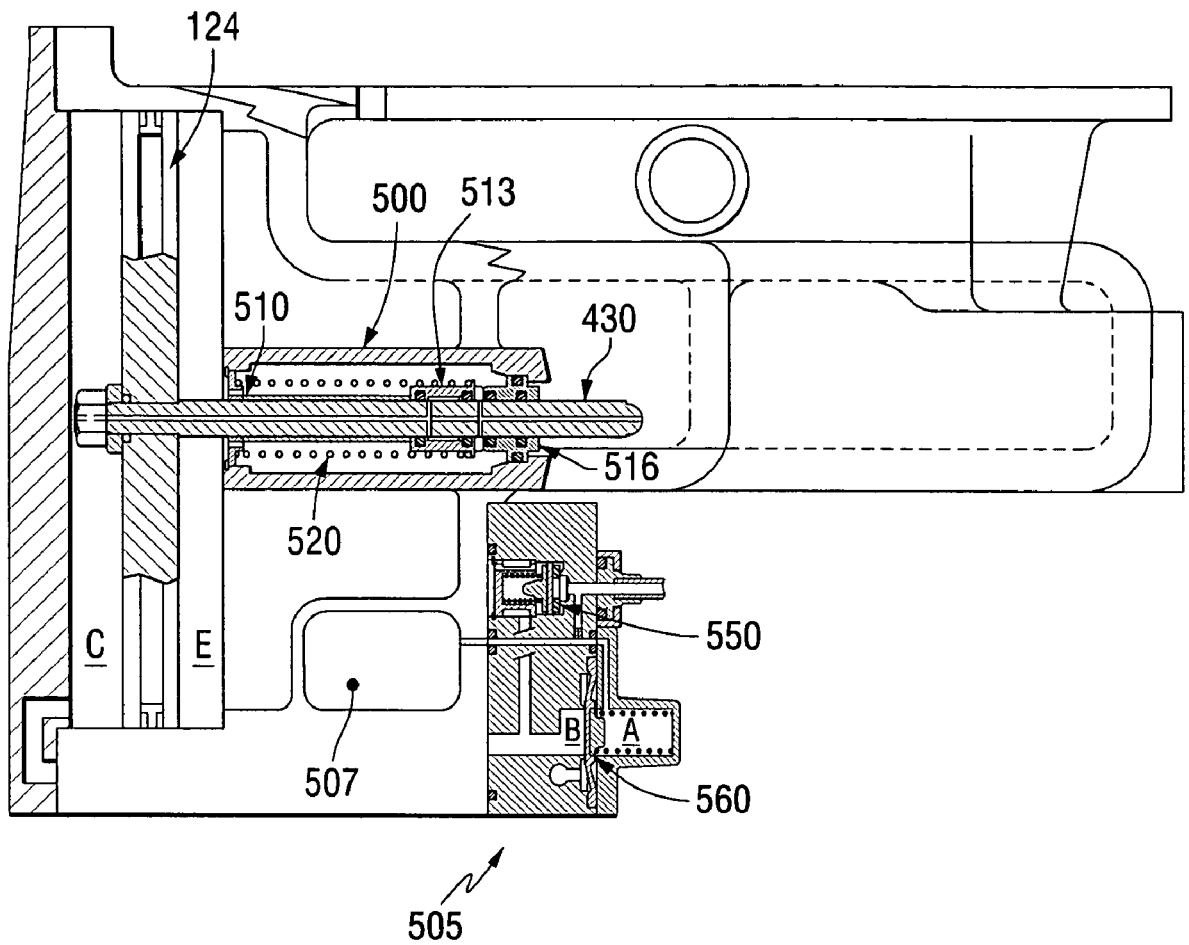
FIG. 27 is a cross section view illustrating a general arrangement of parts of an embodiment of an actuating piston stem assembly and control block for an APB.
Figure 31:
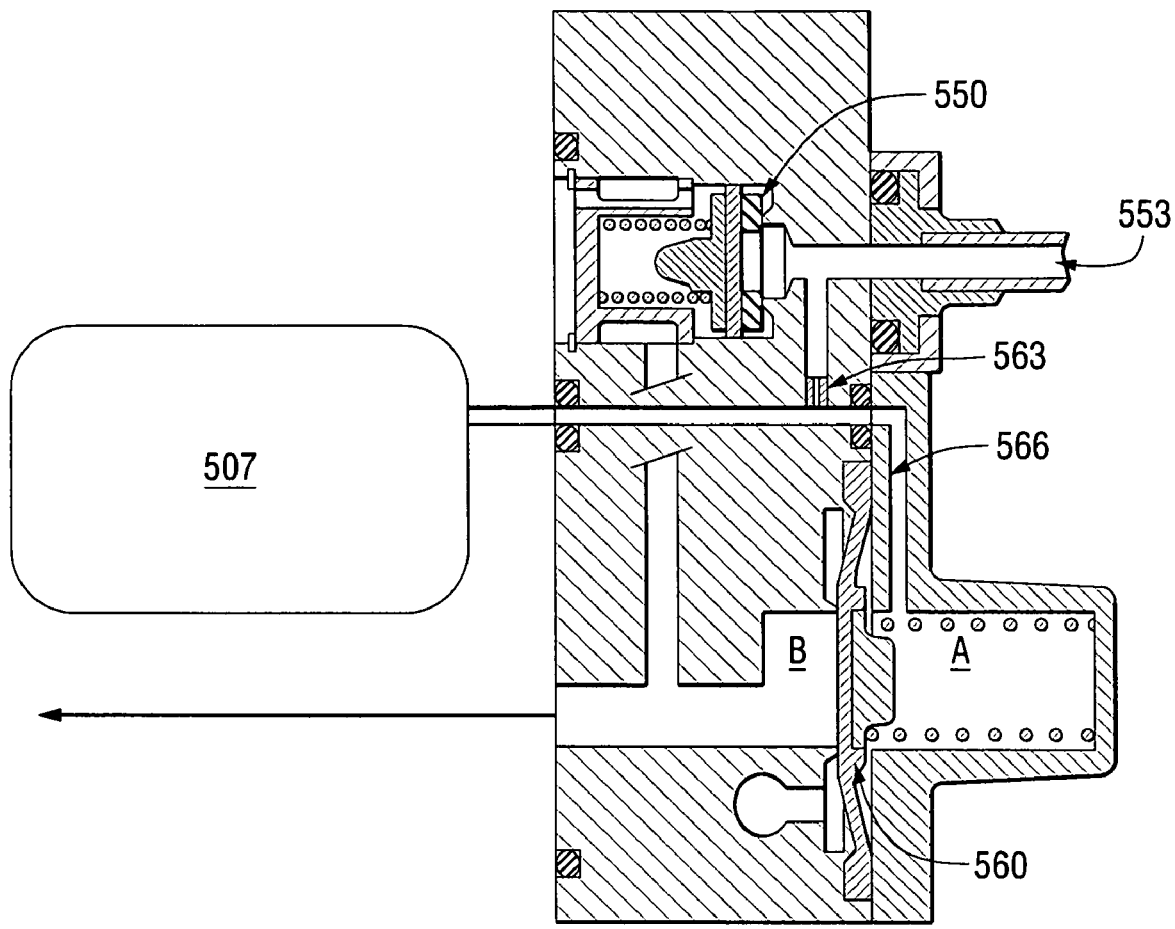
FIG. 31 is a cross section view illustrating a control diagrammatic for an automatic parking brake and actuating piston stem assembly such as shown in FIGS. 30A-30D.
Figure 32:
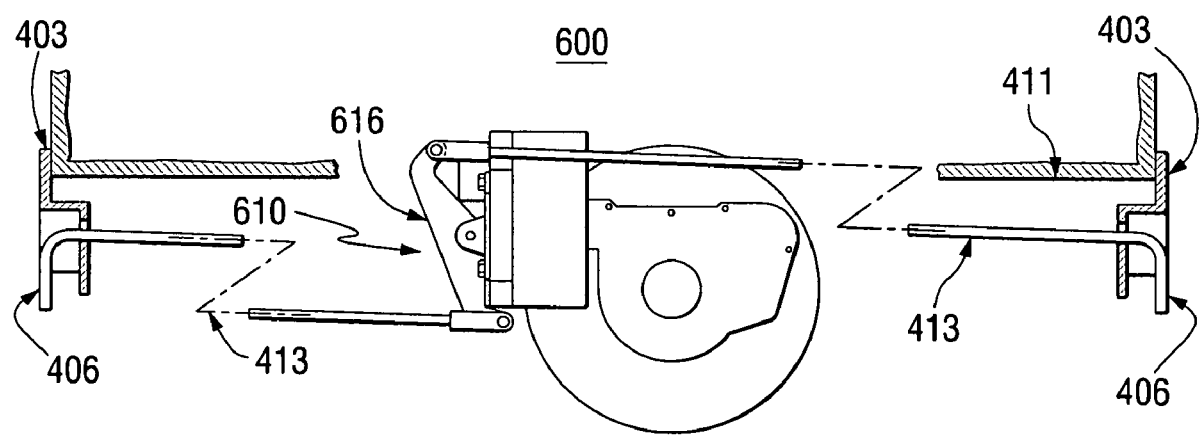
FIG. 32 is a side view of a further embodiment of a manual release and indicator system operatively associated with an automatic parking brake.

Referring now to the cross section view in FIG. 27, a general arrangement of parts is illustrated, including embodiments of an actuating piston stem assembly 500 and a control block 505 therefore are illustrated in the cross section shown in FIG. 31. However, the location of the timing volume 507 is for diagrammatic purposes only, and may be otherwise located. As shown, the embodiment of the actuating piston stem assembly 500 generally includes a spacer tube 510, an equalizing valve portion 513, a combined exhaust valve and stem packing subassembly 516, and a spring 520 which holds the combined exhaust valve and packing subassembly 516 in position. The embodiment of the control block 505 generally includes an application chamber charging check valve, a timing choke and a timing chamber.

Figure 28:
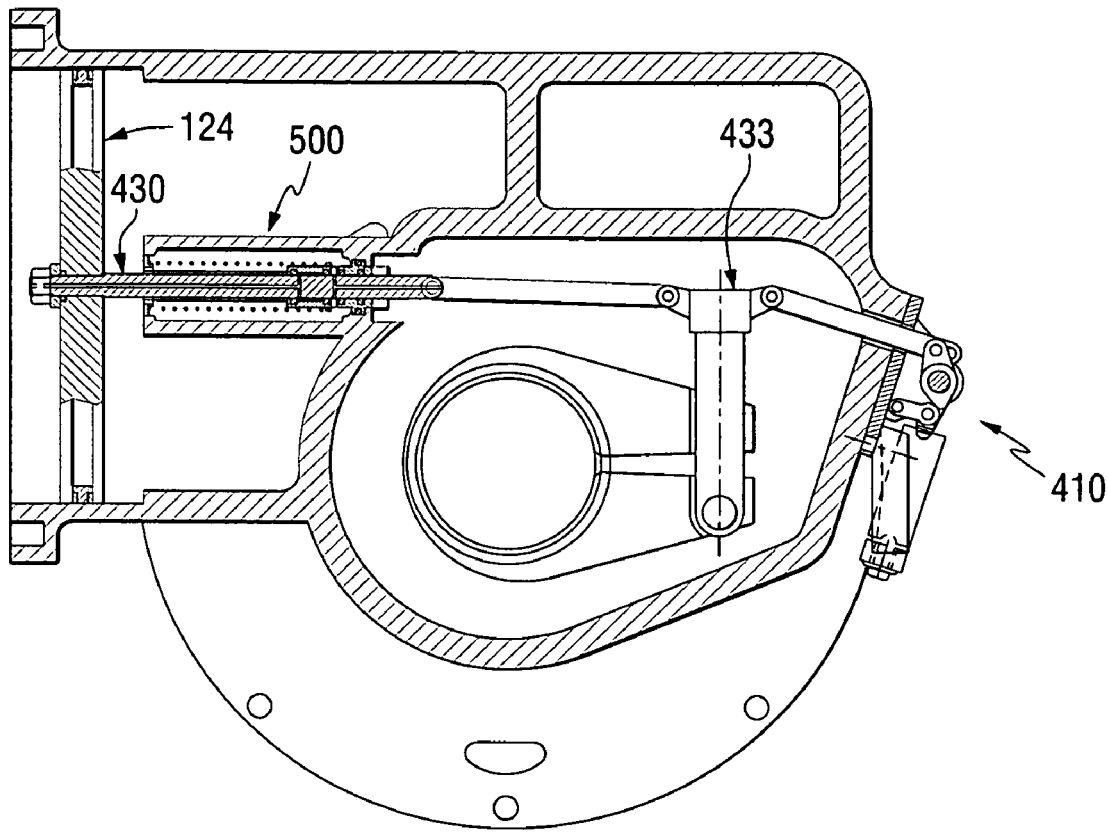
FIG. 28 is a cross section view of an APB and actuating piston stem assembly such as shown in FIG. 27.

FIG. 28 is a cross section view in which a general arrangement of parts is illustrated, similarly to FIG. 27, except illustrating the actuating piston stem assembly 500 and a positioner rod assembly 410 which, as described hereinabove, is operatively connected to the actuating piston stem 430 of the actuating piston 124 via the clamp toggle 433. The control block 505 is not visible in this cross section view.

Figure 29:
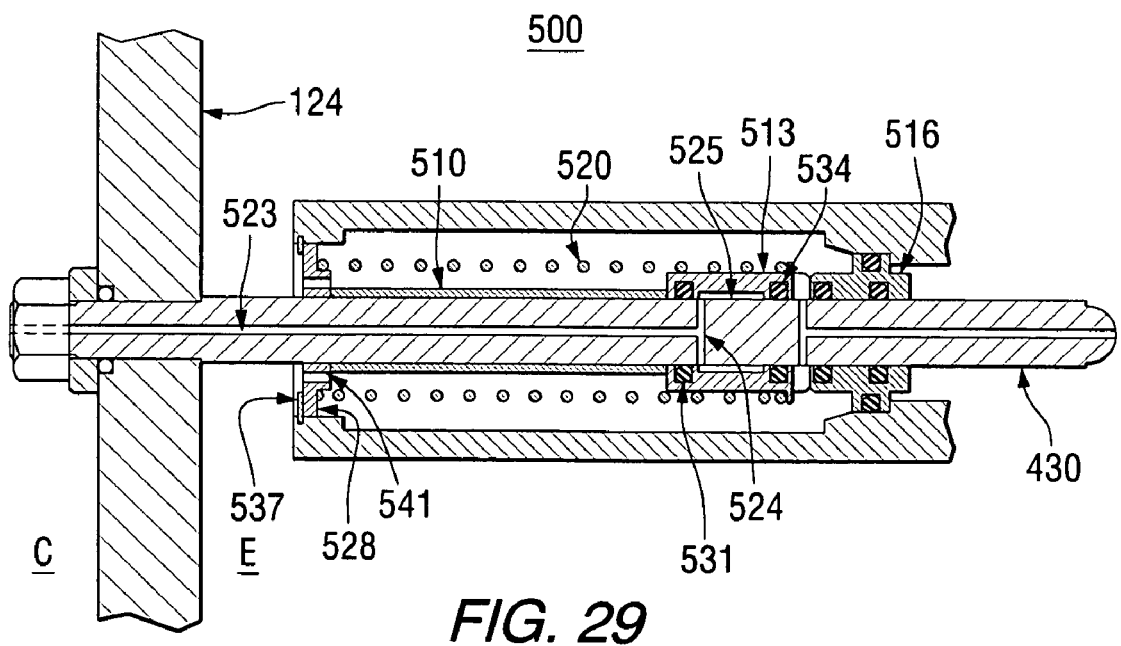
FIG. 29 is a cross section view of an embodiment of an actuating piston stem assembly for an automatic parking brake.

Turning now to FIG. 29 the actuating piston stem assembly 500 is shown in more detail, including the actuating piston stem assembly 500 having the combined exhaust valve and packing subassembly 516, equalizing valve portion 513, and the spring 520 which is used to hold combined exhaust valve and packing subassembly 516 in place. The actuating piston stem 430 is ported, such as an axial air passage 523, that extends, at one end, into the BP side C of the piston 124, and at the other end to a transverse air passage 524 in the stem 430 which communicates with a slotted portion 525 of the equalizing valve portion 513.

A spring seat 528 supports one end of the spring 520, and the opposite end of the spring 520 biases the slotted end of the equalizing valve portion 513 against the exhaust valve and packing subassembly 516. It is to be understood that this is not the only way that this assembly could be conveniently made. For example, if dimensional control were sufficient, the spring could be eliminated and the parts would work acceptably. However, for assembly to be possible the length of the spacer tube 510 would have to be less than the distance from the inner (right hand) face of the spring seat 528 to the left face of the equalizing valve portion 513. Also, the spacer tube 510 can be necessary anyway, because of the possibility that extreme cold could stick the inner seal rings 531, 534 to the stem 430, in which case the movement of the piston 124 to the left during APB application might be able to pull the packing subassembly 516 and equalizing valve portion 513 out of position. Should that occur, with the spacer tube 510 present, the undesired motion of these two parts would be stopped as soon as they had traveled about 0.015 inch. This amount of travel would bring trap the equalizing valve portion 513 between the packing subassembly 516 and spacer tube 510, with spacer tube 510 in abutment with the spring seat 528. The spring seat 528 is held firmly in place by snap ring 537, resulting in the force available to move the sticking O-rings 531, 534 increasing from that of the assembly spring 520, to the entire force of the piston 124, which the O-ring 531, 534 surfaces, cold or not, could not begin to resist.

The general arrangement of the parts at different positions of the actuator piston 124 are shown in FIGS. 30A-30D, which illustrate the air connections and piston 124 travel at each condition. Beginning with FIG. 30A, there is shown the position of the actuating piston stem assembly 500 with the piston 124 at full application position, at which the clamp toggle 433 has moved 0.100 inch beyond maximum lock to provide assurance that the lock will stay on absent air pressure. At this position the distance d, between the valve seat 528 and the right face of the actuating piston 124 is about 0.718 inch. When the APB is applied and the car is standing with no air, this is the normal condition.

In this position, the air passages 523 and 524 communicate with the slotted portion 525 of the body of the exhaust valve and packing subassembly 516. However, in this position the O-rings 531, 534 at opposite ends of the slotted portion 525 of the body of the equalizing valve portion 513 prevent any pressure from the BP side of the piston 124 from communicating with either application chamber E or atmosphere (ATM). This assures that when BP pressure builds up, the piston 124 will move to release position.

As can be seen, the piston stem 430 also has a second transverse air passage 543 which communicates with a second axial air passage 546, which is connected to ATM. In this position of the piston 430, the application chamber E is connected to ATM via air passages 540, 543 and 546, through which all pressure in chamber E is drained to ATM.

Figure 30A:
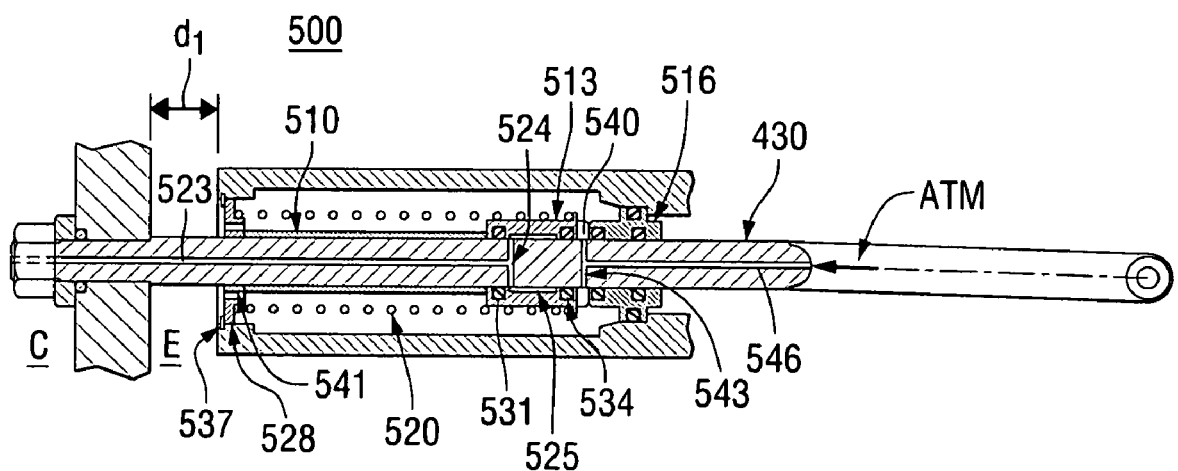
FIG. 30A-30D are cross section views showing the actuating piston stem assembly of FIGS. 27 and 28 in various positions.
Figure 30B:
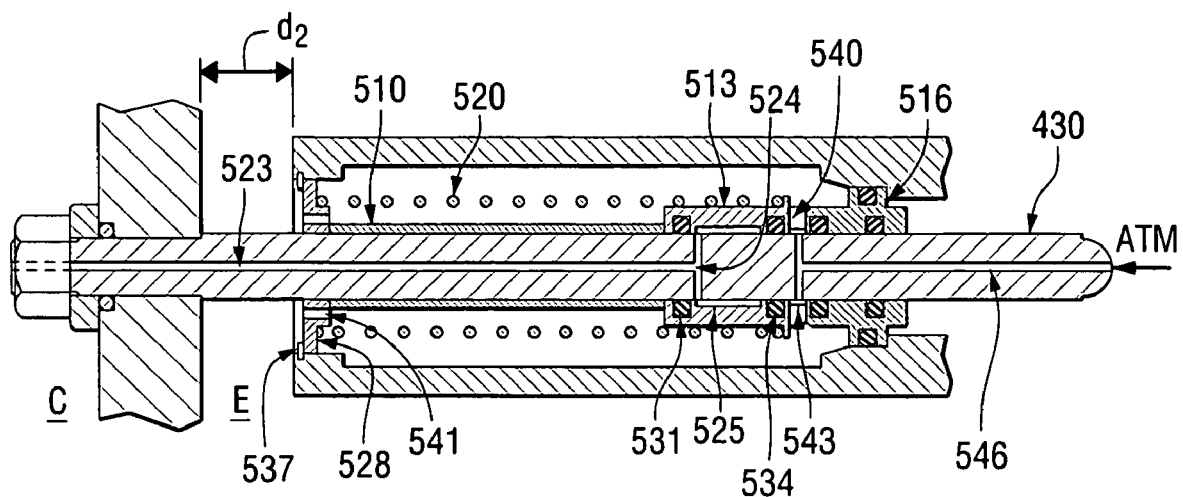

FIG. 30B shows the position of the actuating piston stem assembly 500 with the actuating piston 124 at the maximum application position, i.e., when the detent roller cam 446 is at the maximum position. At this position, the distance $d_2$ has decreased to about 0.618 inch. When the APB is first applied, exhaustion of air pressure from the left side of the piston 124 allows the pressure bottled up in the application chamber E to force the piston 124 to the left. The force opposing this motion first increases with clamping load, then begins to decrease as the increasing lever ratio of the clamp toggle 433 becomes more effective in overcoming the resistance of the clamp until this position is reached, where the mechanical advantage of the clamp has peaked. Beyond this point all forces will aid rather than oppose piston 124 motion, and it is at this point that the air passages 540, 543 and 546 connecting the application chamber E (via air passage 541 in the spring seat 528) to ATM are first opened, bleeding down the no-longer-needed application chamber pressure, to allow either manual or automatic release of the APB to take place.

Figure 30C:
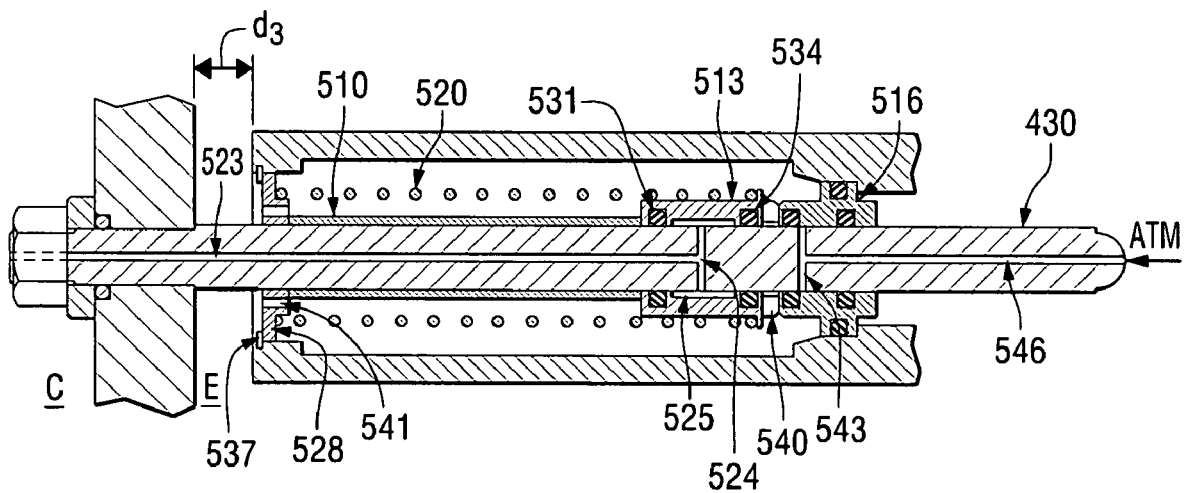

When brake pipe pressure builds up on the BC side of the actuator piston 124 as a result of charging the BP, there is no air on the application chamber E side of the piston 124 to oppose movement of the piston 124. The piston 124 thus moves to the right until reaching the exhaust cut off position, which is shown in FIG. 30C, at which position the distance d3 is about 0.423 inch. At this point there is no pressure in the application chamber E, and the connection of the application chamber E to ATM, via the air passages 543 and 546, is sealed off. The piston 124 continues to move, however, and this additional movement to the right will cause a slight buildup in the relatively large headspace provided by the application chamber E.

Figure 30D:
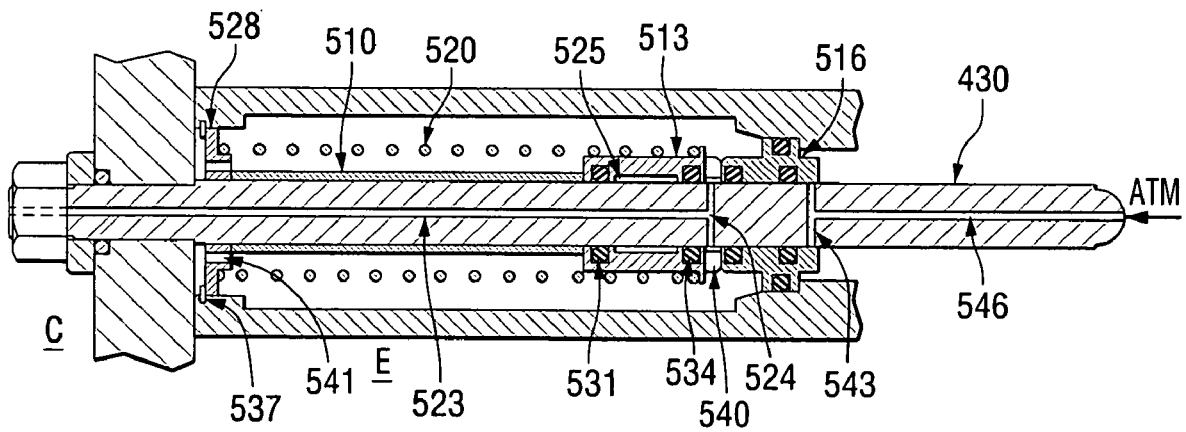

Finally, when the actuator piston 124 has traveled to its stop, as shown in FIG. 30D, which is the application chamber E charging position, the application chamber E will be connected to the BP side of the piston 124 via air passages 523, 524 and 540. In this position, air will flow from the BP side through the axial air passage 523 into the transverse air passage 524. At this position, the transverse passage 524 has been uncovered by the piston stem 430 having moved the transverse passage 524 to the right, out of communication with the blanked slot 525 in the equalizing valve portion 513 and into communication with the application chamber E via the air passage 540, thus connecting the BP side of the piston 124 with the application chamber E.

Turning now to FIG. 31, there is shown a detail view of an embodiment of a control block 505 for an APB having an actuating piston stem assembly 500 as described hereinabove. The control block 505 includes an application chamber charging check valve 550 connected to BP via a BP connection 553. The timing chamber 507 is provided in communication with an application chamber diaphragm valve 560, and the application chamber charging check valve 550 communicates, via a timing choke 563, with a passage 566 connecting the timing chamber. 507 and the application chamber diaphragm valve 560.

Since the charging check valve in the control block 505 doesn't permit the BP side of the actuator piston 124 to bleed down during service brake application, the actuator piston 124 will remain in the position shown in FIG. 30D at all times, so long as the application chamber diaphragm valve 556 doesn't sense excessively low brake pipe pressure.

Under this condition, the relatively small headspace volume of the BP side of the piston 124 remains in communication with the large application chamber E, and should a small amount of leakage across the application chamber charging check valve 550 occur, the pressure will be maintained in the BP side C of the piston 124, insuring against an undesired application of the APB during a service brake application.

Referring now to FIGS. 32-34B, a further embodiment 600 of a combined manual release and status indicator for an automatic parking brake is illustrated. The combined manual release and status indicator 600 can be like the combined manual release and status indicator 400 shown in FIGS. 20-24B in that indicator face plates 403 and release handles 406 can be provided at opposite sides of the rail car body 411. The handles 406 likewise are connected to an operating lever, such as operating lever 616, by positioner rods 413. The differences between this embodiment of the combined manual release and status indicator 600 lies in the indicator/release rod positioner assembly 610, as will be described in more detail below.

Figure 33A:
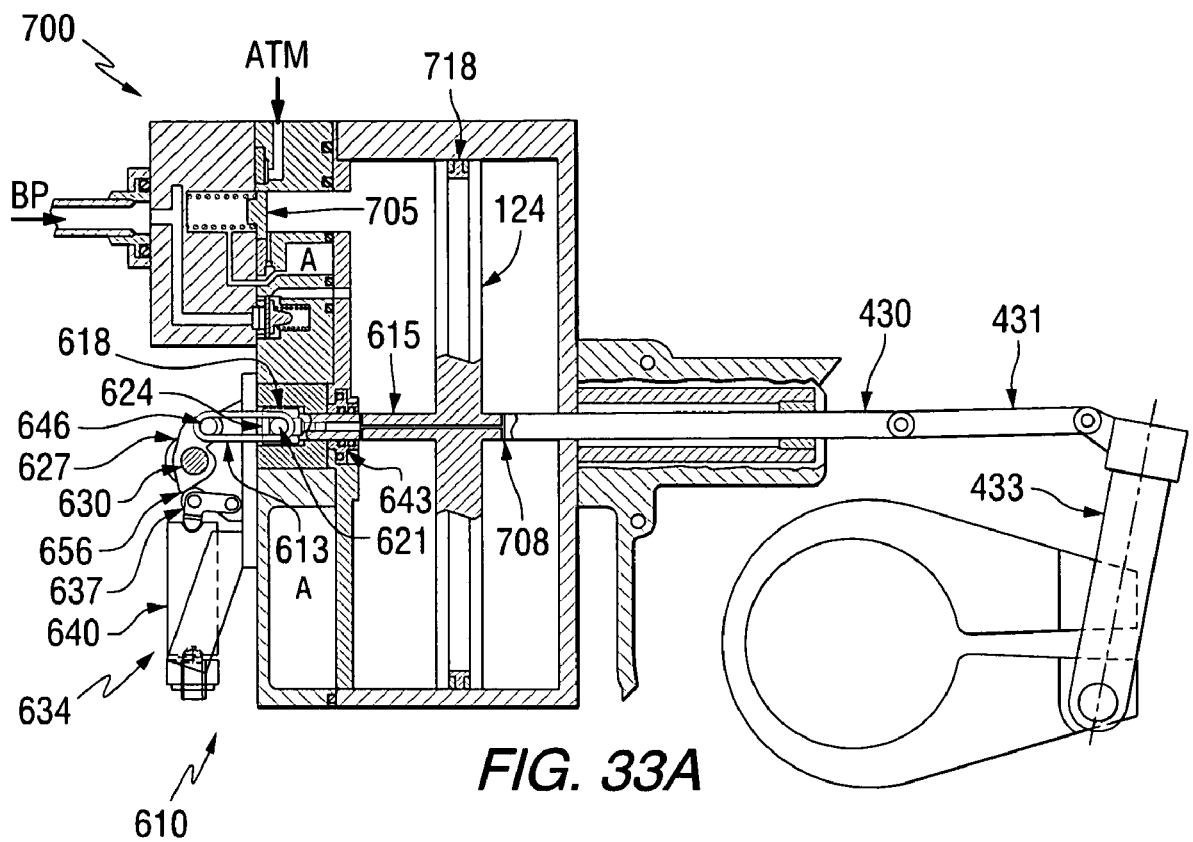
FIG. 33A is a cross section view of the automatic parking brake and manual release and indicator system such as shown in FIG. 23, shown in a release position.
Figure 33B:
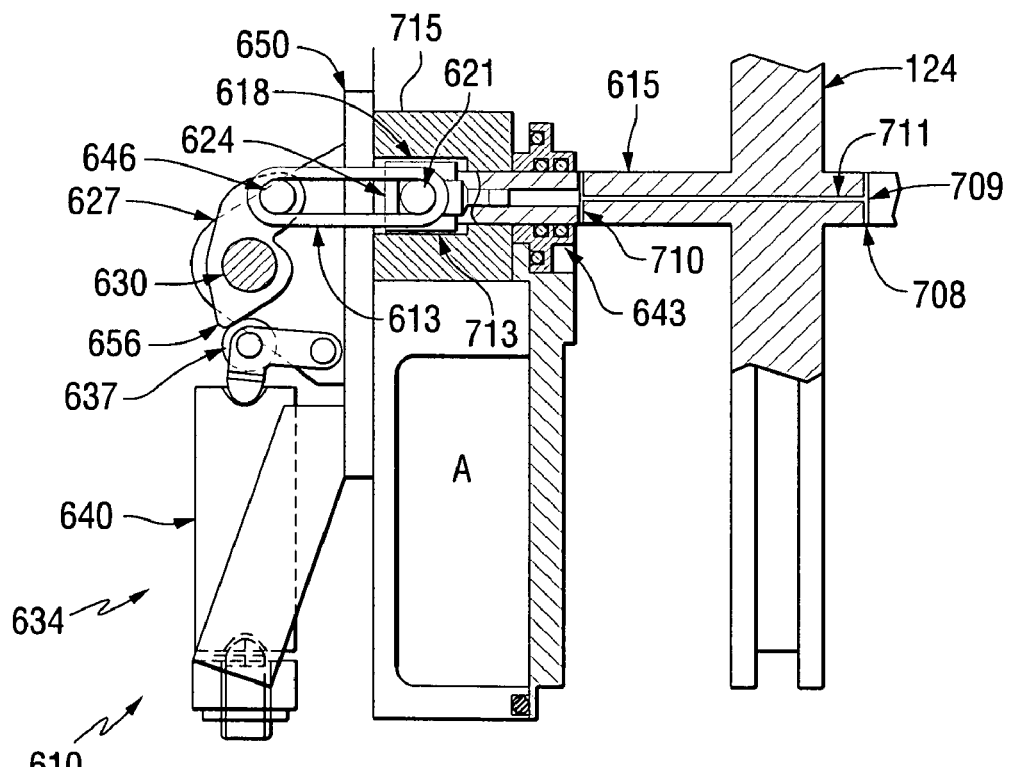
FIG. 33B is a detail view of an embodiment of a positioner mechanism of the manual release and indicator system such as shown in FIG. 24A.
Figure 34A:
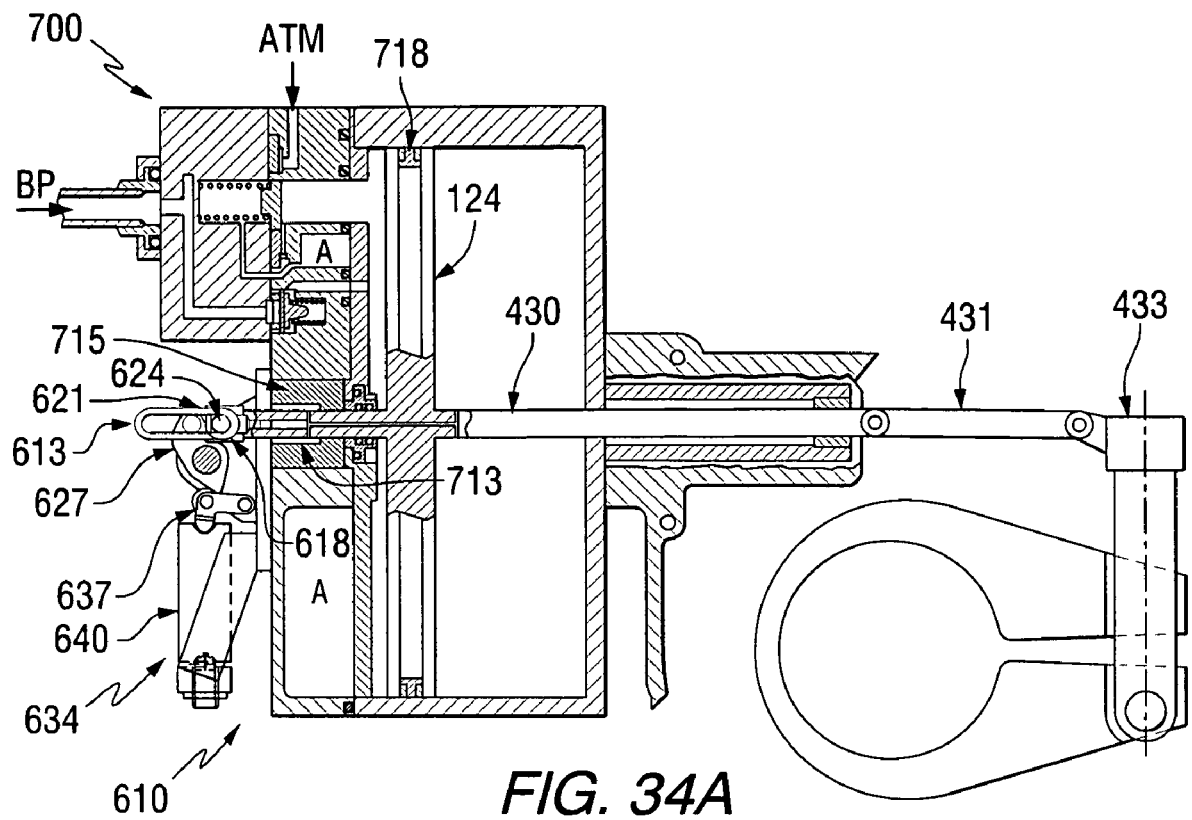
FIG. 34A is a cross section view illustrating a control diagrammatic for an automatic parking brake and manual release and indicator system such as shown in FIG. 23.
Figure 34B:
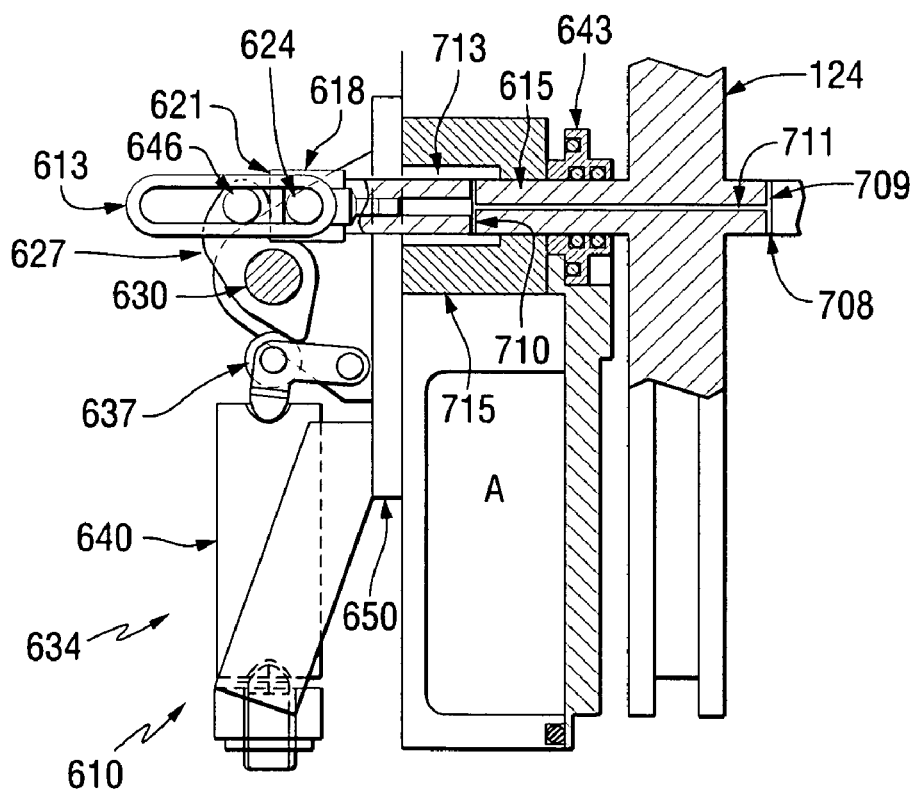
FIG. 34B is a detail view of the control diagrammatic in FIG. 25A.

An embodiment of the indicator/release rod positioner assembly 610 and a control block portion 700 are illustrated in more detail FIGS. 33A-34B. In particular, FIGS. 33A and 33B are cross section views of the APB in a release position whereas FIGS. 34A and 34B show the APB in an applied position.

FIG. 33A is cross section view through the APB actuator cylinder and positioner assembly 610, and FIG. 33B is a detail view of the positioner assembly 610. As shown, the positioner assembly 610 includes an actuator link 613 operatively connected to a tail stem, or tail rod, portion 615 of the actuator piston rod/stem 430, which is connected at an opposite distal end thereof to an H-link 431 and thus the clamp operating toggle 433. A cross-head 618 is mounted on the end of the tail stem 615 and includes a pin 621 which protrudes out from the cross-head 618. A retaining screw 624 can be used to secure the cross-head 618 to the tail stem 615. Preferably, a second pin (not shown) protrudes from an opposite side of the cross-head 618 and the actuator link 613 is a pair of actuator links (the second link is not shown), and one end of each actuator link 613 is connected to the cross-head 618 via each of the pins 621. The opposite end of each actuator link 613 is connected to a combined operating link/detent cam 627, which connection can be similarly accomplished via pin 646 projecting from an adjacent end of the operating link/detent cam 627 which cooperates with the actuator link 613. As with the pin 624, the pin 646 can include a rearwardly protruding pin portion which connects to the second actuating link (not shown).

The operating link/detent cam 627 is connected to the operating lever 616 via a positioner shaft 630, which can be an end portion of the positioner rod 613. Additionally, a detent spring and roller assembly 634 is provided associated with the operating link/detent cam 627. The detent spring and roller assembly 634 includes a cam roller 637 and a spring 640. The tail stem 615 is sealed at the cylinder wall by a floating gland 643.

FIG. 33B shows more clearly, along with the above-described elements, a positioner body 650 which operatively associates the combined operating link/detent cam 627 with the other elements of the positioner assembly 610, including the detent spring and roller assembly 634.

The positioner assembly 610 operates as an indicator in response to the position of the actuator piston 124 as described below, in correspondence with various operating conditions of the brake on the rail car.

When the actuator piston 124 is forced to the release position, the tail stem 615 of the actuating piston 124 moves to the right, carrying therewith the cross-head 618 mounted on the end of the tail stem 615. As described above, the pin 621 protruding from the cross-head 618 protrudes out (from the page) through the actuating link 613, and a second identical actuating link loops over the a second pin, or the rear portion of the same pin 621, which protrudes out of sight (into the page). As the piston 124 and the cross-head 618 on the tail stem 615 move to the right, the actuating link 613 is pulled along by the crosshead pin 621, and because the actuating link 613 also loops the pin 646 on the operating lever/detent cam 627, the operating lever/detent cam 627 is pulled to the right as well. The operating lever/detent cam 627 is fixed to the positioner shaft 630 and will attempt to rotate the shaft 630 clockwise. This rotation will initially be resisted by the detent cam 627 having to compress a relatively heavy detent spring 640. Since, however, the piston 124 is capable of exerting several hundred pounds of force on the actuating link(s) 613, the detent cam 627 and positioner shaft 630 will rotate clockwise until the tip of the cam lobe 656 passes the contact point with the detent cam roller portion 637, beyond which point the spring 640 and roller portion 637 will force the operating lever/detent cam 627 to rotate to its fully clockwise position, either aiding the piston 124 in its travel to the right, or producing slack between the actuating link(s) 613 and the pins 621 and 646.

Since the travel of the pins 621 and 646 is well beyond that needed to bring the detent cam 627 to the point where it will pass the cam roller portion 637, the actuating link(s) 613 will only go slack when the positioner shaft 630 has rotated well beyond the position in which the clamp mechanism is certain to be released. Thus, while the piston rod 430 is unloaded by both the clamp and the indicator mechanism in the release position, the heavy detent spring 640 and the detent cam roller portion 637 maintain a clockwise torque on the positioner shaft 630.

Referring back to FIG. 32 momentarily, the positioner shaft 630 is fixed to the double ended operating lever/detent cam 627, so this torque will rotate the operating lever/detent cam 627 clockwise and force both release handles 406 out sufficiently (about 3 inches) from the operating station face plates 403 to be very visible to attendant personnel. The maintaining torque is chosen sufficiently high to prevent movement of the rods toward the inward, or "applied," indication by vibration. Thus when one looks at the operating station placard, i.e., face plate 403, one will see the release handle 406 protruding and, upon reading the placard 403, will know the indicator's meaning as required.

Referring to FIG. 33A, showing the control block 700, when the car's air brake system goes into emergency all air is exhausted from the actuator control input, and air from chamber A will bleed down until the diaphragm check valve 705 opens. This connects the left hand side of the actuator piston 124 to ATM, and allows the stored volume of air trapped on the right side of the piston 124 to force the piston 124 from the (right) release position to the (lft) applied position, which is shown in FIGS. 34A and 34B.

Turning to FIGS. 34A and 34B, the actuator piston 124 is illustrated in the applied position as mentioned above, in which the actuating piston 124 and tail stem 615 are forced to the left. The initial movement of the piston 124 has no influence on the positioner shaft 624 until the head of the cross-head retaining screw 621 strikes an actuator lever roller 653 which urges the combined operating link/detent cam 627 to rotate counterclockwise. The roller 653 is essentially a stop which prevents further lateral travel of the pin(s) 646 on the operating link/detent cam 627 within the actuating link 613. When this lateral movement is halted by the actuating lever roller 653, the operating link/detent cam 627 is forced to rotate. As before, the rotation is first resisted, then assisted by the detent spring 640 and the detent cam roller 637 working against the cam lobe 656 which is formed onto the lower portion of the combined operating link/detent cam 627. As the piston 124 moves further to the left, the H-link 431 on the right end of the piston 124 pulls the clamp tight, via the toggle 433, and at about the position where lockup is assured, and the detent cam roller 637 passes over the high point of the detent cam lobe 656. Here, as before, the detent spring 640 will rotate the integral cam and lever beyond the travel that might be imparted by the piston 124 so as to force the operating link/detent cam 627 pin 646 and roller 653 away from the head of the cross-head retaining screw 621 and to the fully counterclockwise position of the positioner shaft 630. This rotates the double-ended operating link/detent cam 627 to the release position, as shown. As before, at the end of the stroke, there is no force on the positioner shaft 630 except for the holding torque applied by the detent spring 640.

With the positioning assembly 610 in the position shown in FIGS. 34A and 34B, both release handles 406 will be withdrawn "flush" with the face plates 403 of the operating stations, and as before, the position of the release handles 406 will be apparent to attendant personnel, who will know that the APB is applied.

As explained previously, when the APB is applied, there may or may not be brake cylinder pressure present. However, normally for several hours after an emergency application of brakes there would be such pressure. Thus, in order to move cars without interference for switching purposes, yardmen at present must walk to each car in a train, and pull the brake cylinder release rod on each one. With the APB a second rod must also be pulled, and the indicator/release rod 413 will serve this function as explained below. Ideally car builders should be instructed to locate these two rods as close to each other as possible so as to make it both simpler for the yard personnel to see that there are two rods to be pulled, and easier to find them both.

When the APB has been set, both sides of the actuating piston 124 are connected to atmosphere, though the right hand face of the piston 124 will have pressure for a period of a minute or so, as the volume of air bleeds off through a control orifice 708. The left side of the piston 124 is connected to ATM via diaphragm valve 705. On the right side of the piston 124, control orifice 708, as shown, comprises a transverse passage 709 on the right side of the piston 124 connected to another transverse passage 710 on the left side of the piston via an axial passage 711. When the piston is moved fully to the left, the transverse passage 709 on the left side of the piston communicates with atmosphere via an annular slot 713 in dirt protector 715 insert on the left side of the brake cylinder device.

Once this initial period has timed out, the operating lever/detent cam 627 will prevent accidental motion from impacts, etc., from causing the actuating piston 124 to move and possibly "knock off" the APB. However, when attendant personnel want to move the car without the APB, it is only necessary for them to pull on the release handle 403 if it is "flush" with the face plate 406. This is because with no air in the system, the leverage of the positioner lever 616 is great enough to multiply the applied force (by a factor of 10:1 or more) to overcome the friction of the piston O-ring 718 and the small amount of over-center clamping force holding the APB applied, and move the actuating piston 124 to the right, thus releasing the clamp on the hollow piston rod.

When cars are subsequently spotted without air, handbrakes will have to be applied in the usual manner. However, if the brake systems are charged when spotted, all that is necessary is to uncouple the car, close the angle cock on the consist still coupled to the locomotive, and move the coupled cars away from the just spotted one(s). This will set the air brake in emergency and return the APB to the applied position shown in FIGS. 34A and 34B.

Although certain embodiments of the invention have been described in detail hereinabove, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A manual brake release for a rail vehicle parking brake, the parking brake having an actuating piston movable between an applied position and a released position, the manual brake release comprising:
   a. a positioner connected to the actuating piston, said positioner operable to move said actuating piston at least from said applied position to said released position;
   b. at least one indicator rod having a handle at one end and an opposite end attached to said positioner such that movement of said indicator rod moves said positioner and thus said actuating piston at least from said applied position to said released position;
   c. an operating station located on at least one side of said rail vehicle, said operating station having a face plate which is visible externally of said rail vehicle, said handle movable relative to said face plate between a first position and a second position, said first and second positions corresponding to said applied and released positions;
   d. said handle movable manually to said second position at which said handle extends outward sufficiently from said face plate such that it can be seen that said handle is at said second position;
   e. markings on said face plate correlating said first and second positions of said handle to said applied and released positions such that said applied and released positions are understandable by viewing a position of said handle relative to said face plate;
   f. an operating lever connected between said at least one indicator rod and said actuating piston, said operating lever rotatable responsive to movement of said at least one indicator rod;
   g. a detent link connected between said operating lever and said actuating piston such that movement of said operating lever moves said detent link and thus said actuating piston; and
   h. wherein movement of said handle to said second position causes said positioner to rotate said operating lever, and thus said detent link which moves said actuating piston to said released position.

2. The manual release of claim 1 further comprising:
   a. a detent cam intermediate said operating lever and said detent link, said detent cam having a cam lobe portion and said detent cam connected to said detent link for rotation thereby;
   b. a detent spring; and
   c. a detent roller pivotally positioned between said cam lobe and said detent spring.

3. The manual release of claim 1 wherein said actuating piston further comprises:
   a. a front face which is subject to pressure in a release chamber and rear face which is subject to pressure in an application chamber;
   b. a stem extending from said rear face, said stem connected to said detent link; and
   c. said stem having at least one internal air passage provided along at least a portion thereof said, said at least one internal air passage selectively communicating said application chamber with atmosphere according to a position of said stem.

4. The manual release of claim 3 wherein said stem further comprises a second internal air passage selectively communicating said application chamber with said release chamber according to a position of said stem.

5. The manual release of claim 1 wherein said actuating piston further comprises:
   a. a front face which is subject to pressure in a release chamber and rear face which is subject to pressure in an application chamber;
   b. a stem extending from said rear face;
   c. a tail stem extending from said front face, said tail stem connected to said detent link; and
   d. said tail stem having at least one internal air passage provided along at least a portion thereof, said at least one internal air passage communicating said application chamber with atmosphere according to a position of said stem.

6. The manual release of claim 4 further comprising an actuating piston stem assembly enclosing a portion of said stem, said stem movable within said actuating piston stem assembly, and said actuating piston stem assembly controlling communication between said application chamber and atmosphere via said at least one internal air passage in said stem according to a position of said stem within said actuating piston stem assembly.

7. The manual release of claim 6 wherein said actuating piston stem assembly further comprises:
   a. a housing fixed to a brake cylinder in which said actuating piston is movably disposed;
   b. an air passage communicating an interior of said housing with said application chamber;
   c. an exhaust valve portion slidably surrounding a portion of said stem, said exhaust valve portion having an air passage communicating with said interior of said housing and thus said application chamber via said air passage communicating said interior of said housing with said application chamber;
   d an equalizing valve portion slidably surrounding a portion of said stem;
   e. a spacer tube positioned between said equalizing valve portion and an end of said housing;
   f. said equalizing valve portion located between said spacer tube and said exhaust valve portion, said equalizing valve portion having a blanked slot in a surface thereof adjacent to and surrounding said portion of said stem; and
   g. said at least one internal air passage in said stem having a first end communicating with atmosphere and a second end selectively communicating with said air passage in said exhaust valve portion, such that said at least one internal air passage in said stem connects said application chamber with atmosphere according to a position of said stem within said actuating piston stem assembly.

8. The manual release of claim 7 further comprising:
   a. said at least one internal air passage in said stem comprises first and second separate internal air passages in said stem;
   b. said first internal air passage selectively communicating said application chamber with atmosphere;
   c. said second internal air passage selectively communicating said release chamber with said application chamber, said second internal air passage having one end communicating with said release chamber and a second end communicating with one of said blanked slot in said equalizing valve portion and said air passage in said exhaust valve portion; and
   d. wherein said second internal air passage connects said release chamber with said application chamber according to a position of said stem within said actuating piston stem assembly.

9. The manual release of claim 8 wherein said actuating piston stem assembly further comprises a resilient member urging said equalizing valve portion against said exhaust valve portion.

10. The manual release of claim 1 further comprising a control portion, and said control portion comprising:
    a. a first valve having a first side communicating with brake pipe pressure and a second side communicating with said application chamber;
    b. a second valve having a first side and a second side, said second side communicating with said application chamber;
    c. a timing chamber communicating with said first side of said second valve; and
    d. a timing choke communicating said brake pipe pressure with said first side of said second valve.

11. The manual release of claim 10 wherein said first valve is an application chamber charging check valve and said second valve is an application chamber diaphragm valve.

12. The manual release of claim 10 wherein said control portion further comprises an admission valve and a second timing choke, said admission valve comprising:
    a. a first side in communication with said release chamber via said second timing choke;
    b. a second side in communication with said application chamber;
    c. a valve operating rod having one end positioned for engagement by a rear face of said actuating piston, and a second end positioned for abutment with said admission valve on said second side thereof;
    d. said valve operating rod movable responsive to said rear face of said actuating piston engaging said first end of said valve operating rod as said actuating piston moves toward said released position; and
    e. wherein movement of said valve operating rod causes said second end thereof to open said admission valve and connect said application chamber with said release chamber via said second timing choke.

13. The manual release of claim 6 further comprising a control portion, and said control portion comprising:
    a. a first valve having a first side communicating with brake pipe pressure and a second side communicating with said application chamber;
    b. a second valve having a first side and a second side, said second side communicating with said application chamber;
    c. a timing chamber communicating with said first side of said second valve; and
    d. a timing choke communicating said brake pipe with said first side of said second valve.

14. The manual release of claim 13 wherein said first valve is an application chamber charging check valve and said second valve is an application chamber diaphragm valve.

* * * * *

UNITED STATES PATENT AND TRADEMARK OFFICE
CERTIFICATE OF CORRECTION

| | |
|---|---|
| PATENT NO. | : 7,404,473 B2 |
| APPLICATION NO. | : 11/194982 |
| DATED | : July 29, 2008 |
| INVENTOR(S) | : Thomas H. Engle |

It is certified that error appears in the above-identified patent and that said Letters Patent is hereby corrected as shown below:

On the Title Page

At (56) References Cited, change Patent No. "4,612,016" to --4,613,016--.

At Column 28, claim 3, subparagraph c., line 41, delete the first occurrence of "said".

Signed and Sealed this

Seventh Day of October, 2008

JON W. DUDAS
*Director of the United States Patent and Trademark Office*